(12) United States Patent
Polk, Jr.

(10) Patent No.: US 8,691,038 B2
(45) Date of Patent: Apr. 8, 2014

(54) METHOD OF FORMING A MOLDED ARTICLE FROM THERMOFORMABLE THERMOPLASTIC SHEETS

(75) Inventor: Dale E. Polk, Jr., Titusville, FL (US)

(73) Assignee: LRM Industries International, Inc., Rockledge, FL (US)

( * ) Notice: Subject to any disclaimer, the term of this patent is extended or adjusted under 35 U.S.C. 154(b) by 0 days.

(21) Appl. No.: 13/145,655

(22) PCT Filed: Jan. 29, 2010

(86) PCT No.: PCT/US2010/000251
§ 371 (c)(1),
(2), (4) Date: Jul. 21, 2011

(87) PCT Pub. No.: WO2010/087977
PCT Pub. Date: Aug. 5, 2010

(65) Prior Publication Data
US 2011/0277926 A1 Nov. 17, 2011

Related U.S. Application Data

(60) Provisional application No. 61/148,473, filed on Jan. 30, 2009.

(51) Int. Cl.
*B29C 51/10* (2006.01)
*B29C 41/38* (2006.01)
(52) U.S. Cl.
USPC ... 156/245; 156/244.14; 264/545; 425/382 R; 425/388; 425/450.1
(58) Field of Classification Search
USPC ............. 156/244.12, 244.14, 244.21, 244.22; 264/545; 425/379.1, 382 R, 388, 397, 425/450.1, 451, 451.3, 451.4, 451.5, 451.6, 425/259, 261, 463, 464, 453
See application file for complete search history.

(56) References Cited

U.S. PATENT DOCUMENTS 2,338,280 A * 1/1944 Brundage .................. 425/395
2,982,995 A * 5/1961 Groleau ..................... 425/466

(Continued)

FOREIGN PATENT DOCUMENTS

JP         03104610 A  * 5/1991
WO    WO 2008154987 A1 * 12/2008
WO    WO 2008154988 A1 * 12/2008

*Primary Examiner* — William Bell
(74) *Attorney, Agent, or Firm* — Michael A. Ervin; M.A. Ervin & Associates

(57) ABSTRACT

The present invention relates to a method of forming a molded article (e.g., 141) from first and second heated and thermoformable thermoplastic sheets (75, 78), which are each respectively formed in situ from first and second thermoplastic compositions (e.g., by means of extrusion). The heated first and second thermoformable sheets are each drawn by reduced pressure into contour matching contact with the interior mold surfaces (14, 32) of separate first and second mold portions (11, 29), so as to form separate first and second profiled thermoplastic sheets (129, 144) within the separate mold portions. The first and second mold portions (11, 29) are positioned towards each other (e.g., together) so as to bring into contact and fuse together contact portions (159, 163) of the first and second profiled thermoplastic sheets (129, 144). Fusion between the contacted contact portions (159, 163) is achieved by means of (e.g., exclusively by means of) residual heat of sheet formation residing in each of the first and second profiled thermoplastic sheets (129, 144). The present invention also relates to a mold apparatus (e.g., 1) that includes a mold assembly (3, 5) that further includes a first mold portion (11) and a second mold portion (29) that reside between and are rotatably attached to laterally spaced first and second longitudinal supports (171, 174). At least one mold portion is longitudinally repositionable, between the first and second longitudinal supports, relative to the other mold portion.

18 Claims, 19 Drawing Sheets

(56) References Cited

U.S. PATENT DOCUMENTS

| | | | |
|---|---|---|---|
| 3,323,274 A * | 6/1967 | Justus | 53/453 |
| 3,890,075 A * | 6/1975 | Bourdo | 425/88 |
| 3,981,671 A * | 9/1976 | Edwards | 425/453 |
| 4,061,706 A | 12/1977 | Duffield | |
| 4,170,450 A * | 10/1979 | Herrington, Jr. | 425/464 |
| 4,191,523 A * | 3/1980 | Niederst et al. | 425/589 |
| 4,423,000 A * | 12/1983 | Teraoka | 264/524 |
| 4,428,306 A * | 1/1984 | Dresen et al. | 108/53.3 |
| 4,708,625 A * | 11/1987 | Arend | 425/589 |
| 5,168,621 A * | 12/1992 | Kruck et al. | 29/451 |
| 5,411,355 A * | 5/1995 | Gosnell et al. | 410/139 |
| 5,616,350 A * | 4/1997 | Wissmann et al. | 425/133.1 |
| 5,658,523 A * | 8/1997 | Shuert | 264/545 |
| 5,843,366 A | 12/1998 | Shuert | |
| 6,086,800 A | 7/2000 | Manlove | |
| 6,379,606 B1 | 4/2002 | Chun et al. | |
| 6,478,564 B1 * | 11/2002 | Tieu et al. | 425/145 |
| 6,659,758 B2 | 12/2003 | Ekendahl et al. | |
| 6,719,551 B2 * | 4/2004 | Polk, Jr. | 425/126.1 |
| 6,814,905 B1 | 11/2004 | Dalgewicz et al. | |
| 6,969,485 B2 * | 11/2005 | Vorenkamp et al. | 264/545 |
| 6,971,865 B2 * | 12/2005 | Prue | 425/192 R |
| 7,045,086 B2 | 5/2006 | Fitzell, Jr. | |
| 7,157,034 B2 * | 1/2007 | Bristow et al. | 264/250 |
| 7,906,062 B2 * | 3/2011 | Borchert et al. | 264/424 |
| 2006/0113716 A1 * | 6/2006 | Binda et al. | 264/545 |
| 2008/0078761 A1 * | 4/2008 | Borchert et al. | 220/4.13 |
| 2008/0258354 A1 * | 10/2008 | Polk et al. | 264/503 |

* cited by examiner

METHOD OF FORMING A MOLDED ARTICLE FROM THERMOFORMABLE THERMOPLASTIC SHEETS

CROSS-REFERENCE TO RELATED APPLICATIONS

This application is a national stage entry of International Patent Application No. PCT/US2010/000251, filed Jan. 29, 2010, which claims priority to U.S. Provisional Application No. 61/148,473, filed Jan. 30, 2009.

FIELD OF THE INVENTION

The present invention relates to a method of forming a molded article from first and second heated and thermoformable thermoplastic sheets, which are each respectively formed in situ from first and second thermoplastic compositions. The method involves providing a mold apparatus that includes first and second mold portions that are reversibly positionable towards each other. The first and second heated thermoplastic sheets are each separately drawn into contour matching contact with the interior mold surfaces of the first and second mold portions respectively, so as to form separate first and second profiled thermoplastic sheets. The first and second mold portions are then positioned towards each other so as to: place facing portions of the first and second profiled sheets in facing and non-contacting opposition; and contact portions of the profiled sheets in contact with each other. The contact portions of the first and second profiled sheets are fused together by means of residual heat of sheet formation residing in each of the profiled sheets, which results in formation of a molded article.

BACKGROUND OF THE INVENTION

Twin sheet thermoforming processes typically involve providing two separate preformed sheets of thermoplastic material (each usually on a separate roll), heating each of the preformed thermoplastic sheets to a thermoformable temperature, and contacting each of the heated sheets with a separate shaped mold surface, thereby forming shaped sheets on the mold surfaces. The molds are then brought together so as to contact and fuse portions of the shaped sheets together, resulting in formation of a molded article.

Such prior art methods of twin sheet thermoforming typically and undesirably involve multiple steps, such as separately forming the thermoplastic sheets, collecting the preformed thermoplastic sheets on separate rolls, transporting (e.g., shipping) the rolls of preformed thermoplastic sheet to a molder (or fabricator), and re-heating each of the preformed thermoplastic sheets prior to the thermoforming and fusing operations. Such a multiplicity of steps involves the additional consumption of energy, which increases both the economic cost and carbon footprint associated with the process and the molded articles formed thereby.

In addition, the re-heating step may result is uneven heating of one or both of the preformed thermoplastic sheets, which may then result in defective formation of one or both of the shaped sheets, and/or defective fusing of the shaped sheets together. For example, a preformed sheet that has been unevenly re-heated may not properly conform to the shape of the mold when drawn into contact therewith, resulting in structural and/or aesthetic defects in the shaped sheet, (e.g., cracks, tears and/or thickness defects, such as thinning in over-heated areas and thickening in under-heated areas, irregular coloration and/or discoloration). Substandard fusion may alternatively or additionally occur between the contact points of unevenly re-heated preformed sheets, resulting in molded articles having fusion area defects that may undergo catastrophic failure (e.g., cracking and/or separation) when exposed to static and/or dynamic loading.

U.S. Pat. No. 7,045,086 B2 discloses a twin sheet thermoforming process and carousel apparatus that involves simultaneously heating two preformed thermoplastic sheets in a single heating station, rather than sequential heating of the preformed sheets.

Single sheet thermoforming processes that involve the continuous extrusion of a thermoplastic sheet, that is thermoformed using residual heat from the extruded thermoplastic sheet are known. See, for example, U.S. Pat. Nos. 6,814,905 B1, 6,086,800 and 4,061,706.

It would be desirable to develop new twin sheet thermoforming processes, and apparatuses used therewith, that minimize or eliminate the multiple steps typically encountered with prior art methods. In addition, it would be further desirable that such newly developed methods and apparatuses also provide molded articles having physical properties that are at least equivalent to those of molded articles prepared by prior methods.

SUMMARY OF THE INVENTION

In accordance with the present invention, there is provided, a method of preparing a molded article including at least the steps of: providing a mold apparatus comprising, a first mold portion having an interior mold surface, and a perimeter edge, the interior mold surface of the first mold portion having a contour and a plurality of perforations, and a second mold portion having an interior mold surface, and a perimeter edge, the interior mold surface of the second mold portion having a contour and a plurality of perforations, the first mold portion and the second mold portion being reversibly positionable so as to reversibly position the interior surface of the first mold portion and the interior surface of the second mold surface in facing opposition, forming, from a first thermoplastic composition, a heated first thermoplastic sheet having a temperature that renders the heated first thermoplastic sheet thermoformable, the heated first thermoplastic sheet having a first surface and a second surface, forming, from a second thermoplastic composition, a heated second thermoplastic sheet having a temperature that renders the heated second thermoplastic sheet thermoformable, the heated second thermoplastic sheet having a first surface and a second surface; contacting a first portion of the second surface of the heated first thermoplastic sheet with the perimeter edge of the first mold portion, contacting a first portion of the second surface of the heated second thermoplastic sheet with the perimeter edge of the second mold portion; drawing reduced pressure through the plurality of perforations of the interior mold surface of the first mold portion, such that a second portion of the second surface of the first heated thermoplastic sheet substantially matches the contour of the interior mold surface of the first mold portion, thereby forming a first profiled thermoplastic sheet having a second surface in contact with the interior mold surface of the first mold portion and a first surface that is substantially opposed to the second surface of the first profiled thermoplastic sheet, drawing reduced pressure through the plurality of perforations of the interior mold surface of the second mold portion, such that a second portion of the second surface of the second heated thermoplastic sheet substantially matches the contour of the interior mold surface of the second mold portion, thereby forming a second profiled thermoplastic sheet having a second surface in contact with the interior mold surface of the second mold portion and a first surface that is substantially opposed to the second surface of the second profiled thermoplastic sheet; positioning the first mold portion and the second mold portion towards each other thereby, placing in facing opposition, and free of contact, a facing portion of the first surface of the first profiled thermoplastic sheet and a facing portion of the first surface of the second profiled thermoplastic sheet, and contacting a contact portion of the first surface of the first profiled thermoplastic sheet and a contact portion of the first surface of the second profiled thermoplastic sheet; fusing together the contact portion of the first surface of the first profiled thermoplastic sheet and the contact portion of the first surface of the second profiled thermoplastic sheet, by means of residual heat of sheet formation residing in each of the first profiled thermoplastic sheet and the second profiled thermoplastic sheet, thereby forming a fused and profiled multisheet article; and cooling the fused and profiled multisheet article thereby forming the molded article, wherein the facing portion of the first surface of the first thermoplastic profiled sheet and the facing portion of the first surface of the second thermoplastic profiled sheet together define an interior space of the molded article.

In accordance with the present invention, there is further provided a mold apparatus as described above, that may be used in performance of the method of the present invention. In particular, the mold apparatus includes at least: a first mold portion having an interior mold surface, and a perimeter edge, the interior mold surface of the first mold portion having a contour and a plurality of perforations dimensioned to have reduced pressure drawn there-through, so as to provide for formation of, from a heated first thermoplastic sheet having a temperature that renders the heated first thermoplastic sheet thermoformable, a first profiled thermoplastic sheet having a second surface in contact with the interior mold surface of the first mold portion and a first surface that is substantially opposed to the second surface of the first profiled thermoplastic sheet; a second mold portion having an interior mold surface, and a perimeter edge, the interior mold surface of the second mold portion having a contour and a plurality of perforations dimensioned to have reduced pressure drawn there-through, so as to provide for formation of, from a heated second thermoplastic sheet having a temperature that renders the heated second thermoplastic sheet thermoformable, a second profiled thermoplastic sheet having a second surface in contact with the interior mold surface of the second mold portion and a first surface that is substantially opposed to the second surface of the second profiled sheet; a first longitudinal support; and a second longitudinal support, wherein, the first longitudinal support and the second longitudinal support are laterally spaced relative to each other, the first mold portion and the second mold portion each residing between the first longitudinal support and the second longitudinal support, the first mold portion being rotationally attached to the first longitudinal support and the second longitudinal support, thereby allowing the first mold portion to be reversibly rotatable about a lateral axis of the first mold portion between the first longitudinal support and the second longitudinal support, the second mold portion being rotationally attached to the first longitudinal support and the second longitudinal support, thereby allowing the second mold portion to be reversibly rotatable about a lateral axis of the second mold portion between the first longitudinal support and the second longitudinal support, and at least one of the first mold portion and the second mold portion being reversibly longitudinally positionable between the first longitudinal support and the second longitudinal support, so as to reversibly position the interior surface of the first mold portion and the interior surface of the second mold surface in facing opposition, further wherein, reversible rotation of the first mold portion about the lateral axis of the first mold portion and reversible rotation of the second mold portion about the lateral axis of the second mold portion places the first surface of the first profiled thermoplastic sheet and the first surface of the second profiled thermoplastic sheet in facing opposition relative to each other, and at least one of, positioning longitudinally the first mold portion towards the second mold portion, and positioning longitudinally the second mold portion towards the first mold portion, provides, placement in facing opposition, and free of contact, a facing portion of the first surface of the first profiled thermoplastic sheet and a facing portion of the first surface of the second profiled thermoplastic sheet, and contact and fusion of, a contact portion of the first surface of the first profiled thermoplastic sheet and a contact portion of the first surface of the second profiled thermoplastic sheet, thereby providing formation of a molded article.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings in which preferred (though non-limiting) embodiments of the invention are illustrated and described.

As used herein and in the claims, terms of orientation and position, such as, "upper", "lower", "inner", "outer", "right", "left", "vertical", "horizontal", "top", "bottom", and similar terms, are used to describe the invention as oriented and depicted in the drawings. Unless otherwise indicated, the use of such terms is not intended to represent a limitation upon the scope of the invention, in that the invention may adopt alternative positions and orientations.

Unless otherwise indicated, all numbers or expressions, such as those expressing structural dimensions, quantities of ingredients, etc., as used in the specification and claims are understood as modified in all instances by the term "about".

BRIEF DESCRIPTION OF THE DRAWINGS

FIG. 10 is a representative perspective view of the mold apparatus of FIG. 9 in which the first and second mold portions have been separated, so as to release the molded article from there-between.

In FIGS. 1 through 19, like reference numerals designate the same components and structural features, unless otherwise indicated.

DETAILED DESCRIPTION OF THE INVENTION

Figure 1:
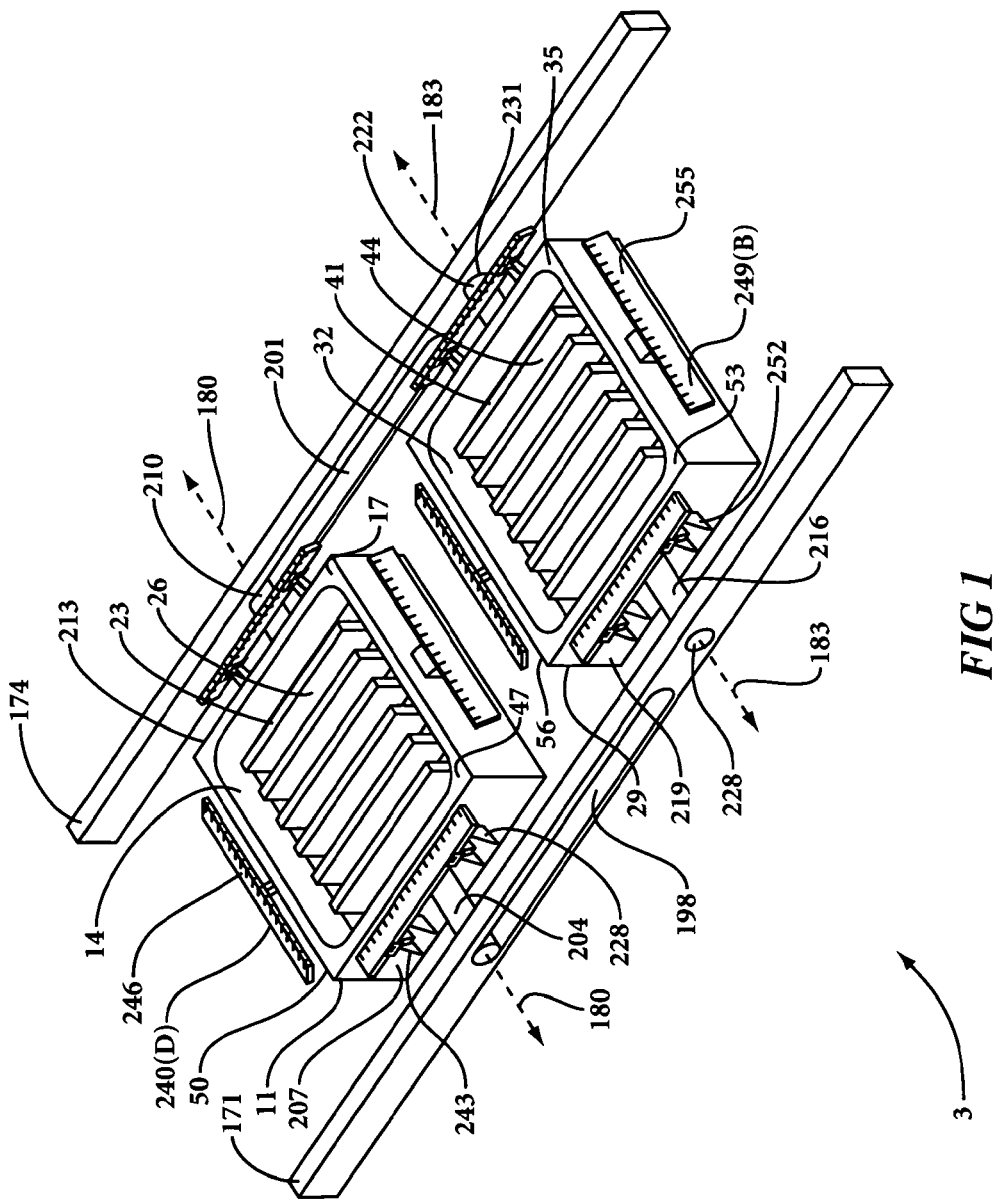
FIG. 1 is a representative perspective view of a mold assembly according to the present invention that includes first and second mold portions, and first and second longitudinal supports.
Figure 2:
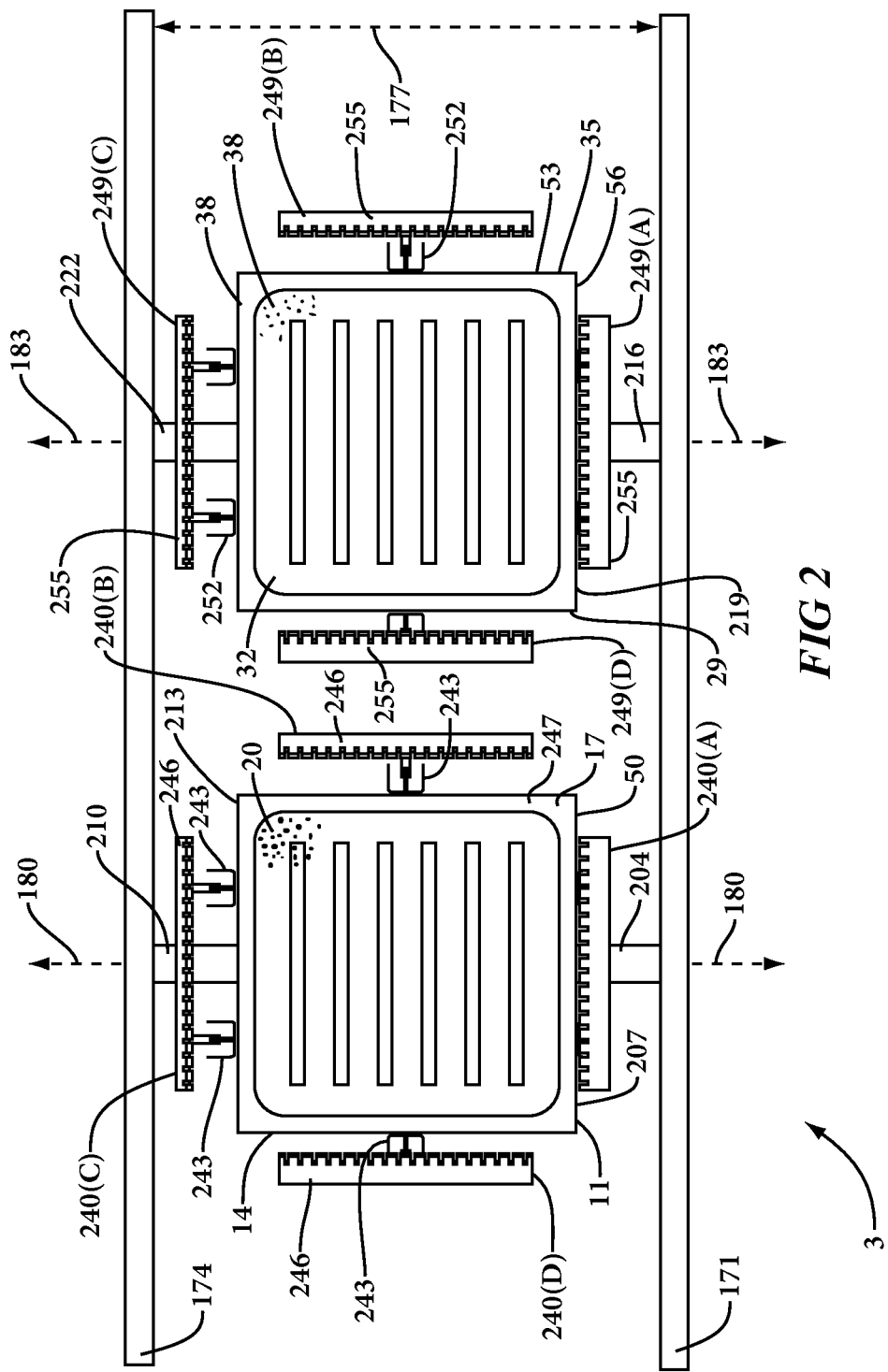
FIG. 2 is a representative top plan view of the mold assembly of FIG. 1.
Figure 4:
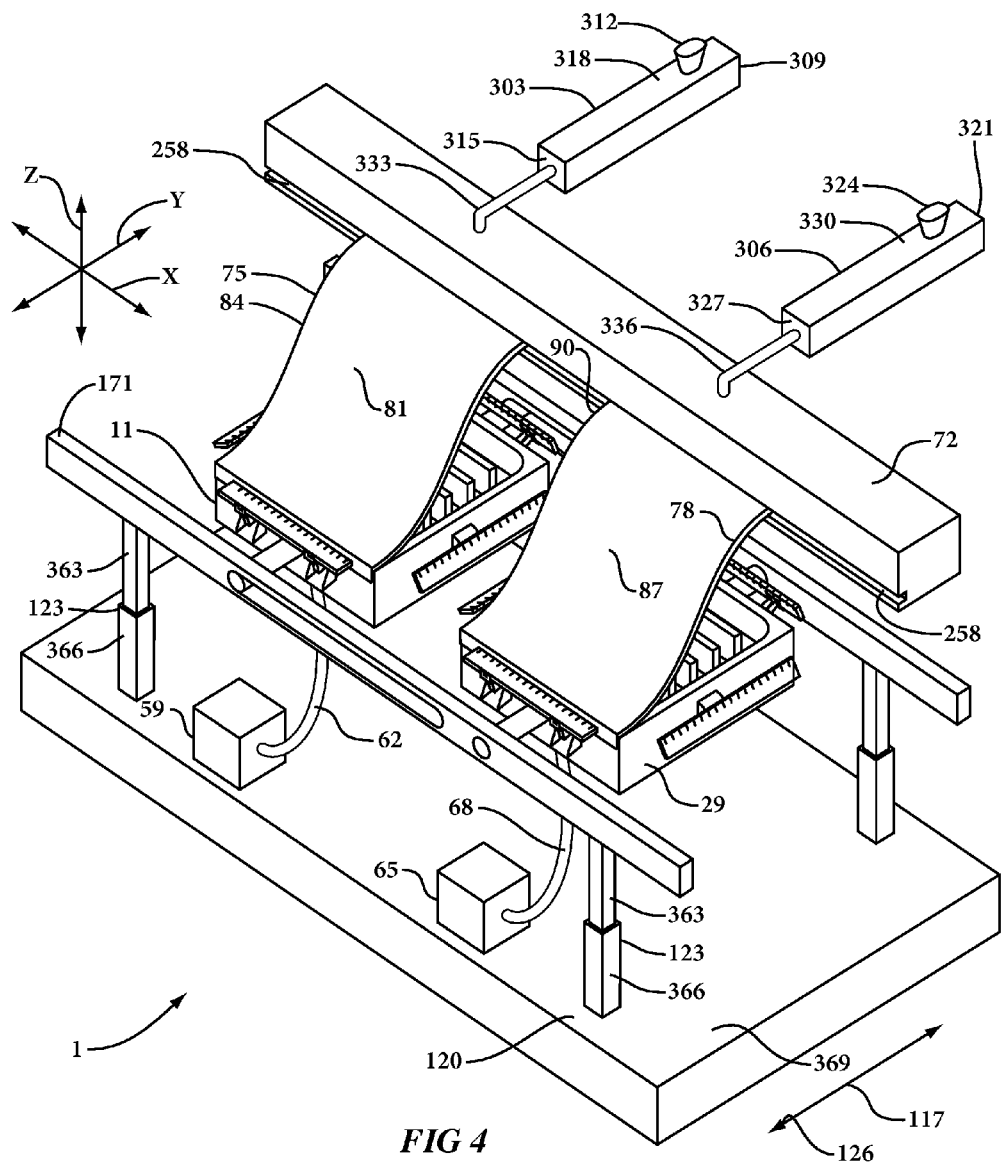
FIG. 4 is a representative perspective view of a mold apparatus of the present invention that includes the mold assembly of FIG. 1, a platform, a sheet die, vacuum apparatae, and extruders, and in which heated first and second thermoplastic sheets are shown in initial contact with the perimeter edges of the first and second mold portions.
Figure 5:
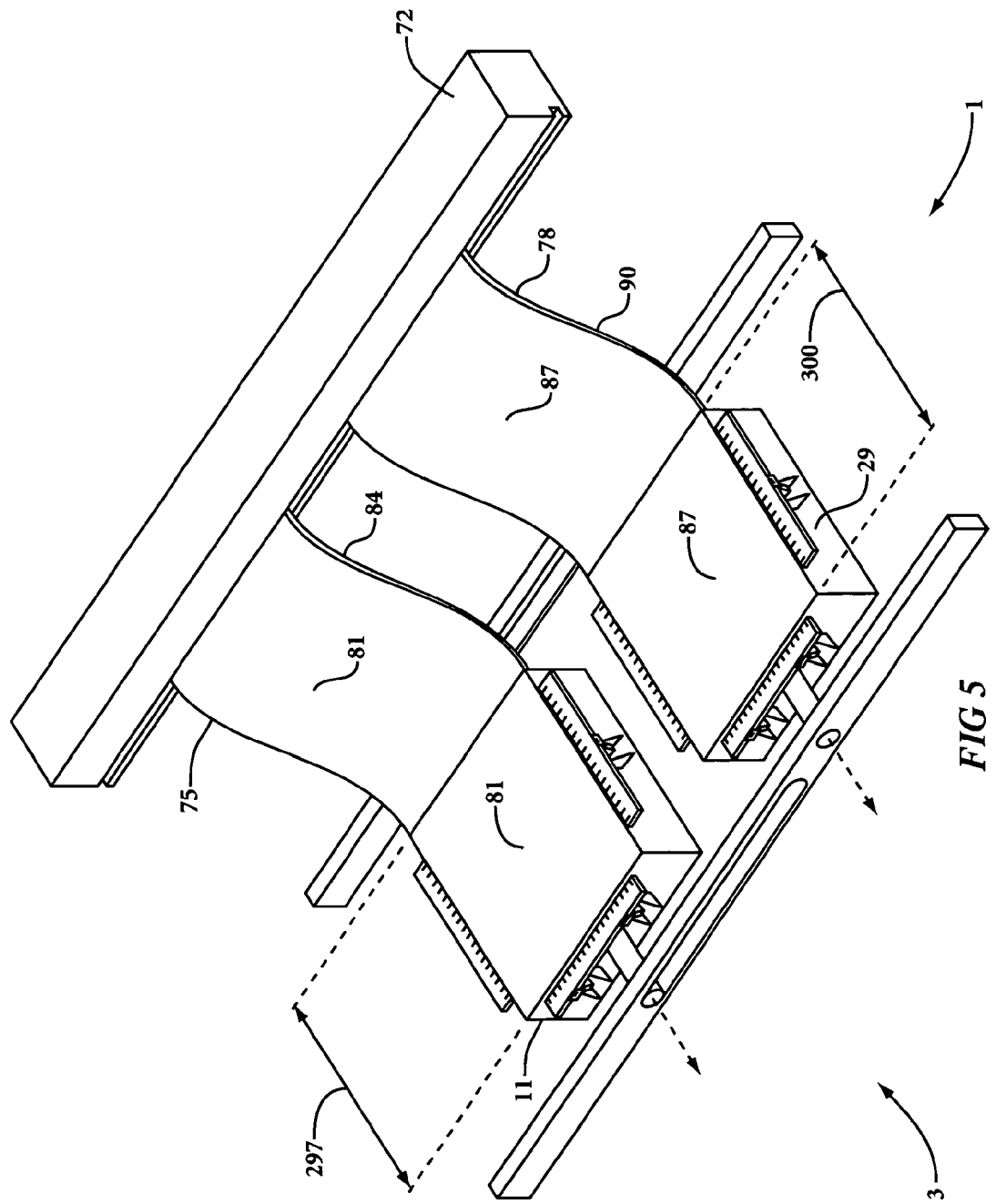
FIG. 5 is a representative perspective view of a portion of the mold apparatus of FIG. 4, in which the heated first and second thermoplastic sheets are in substantially complete contact with the perimeter edges of the first and second mold portions.
Figure 6:
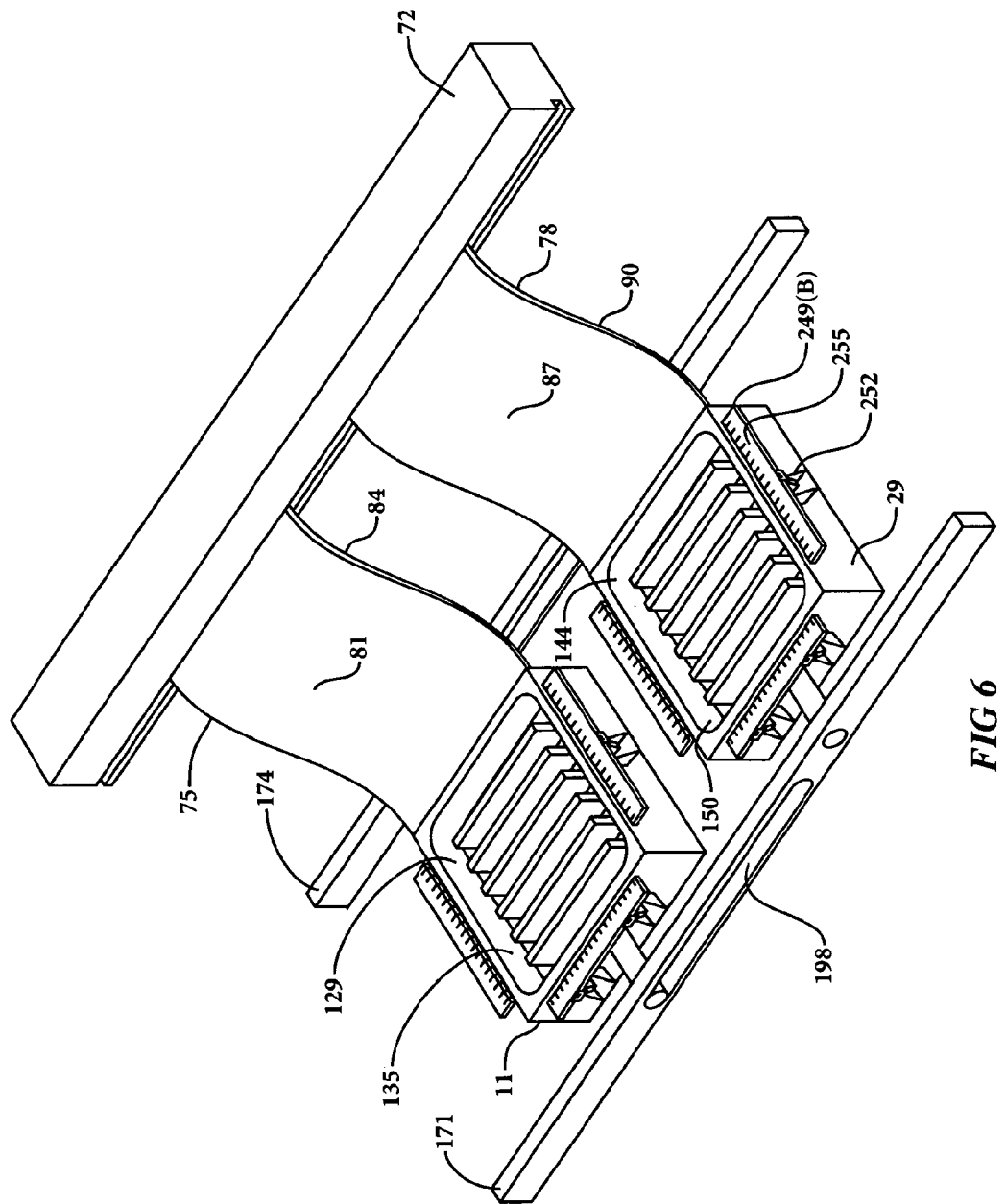
FIG. 6 is a representative perspective view of the mold apparatus of FIG. 5, in which the heated first and second thermoplastic sheets are each drawn by reduced pressure into contour matching contact with the interior mold surfaces of the first and second mold portions, thereby forming first and second profiled thermoplastic sheets.

With reference to FIGS. 1, 2 and 4 of the drawings, the method of the present invention involves providing a mold apparatus 1, and more particularly a twin sheet molding apparatus 1, that includes a mold assembly 3. Mold assembly 3 includes a first mold portion 11 having an interior mold surface 14, and a perimeter edge 17. Interior mold surface 14 of first mold portion 11 has a contour and a plurality of perforations 20 (FIG. 2). The contour of interior mold surface 14 of first mold portion 11 may include, for example, raised portions 23 and/or recessed portions 26. Interior mold surface 14 may be a substantially recessed or female interior mold surface (as depicted), in which case, portions thereof reside substantially below (i.e., not extending outward beyond) and optionally even with, perimeter edge 17. Alternatively, interior mold surface 14 may be a substantially raised or male interior mold surface (not depicted), in which case, a majority of interior mold surface 14 resides above (or outward relative to) perimeter edge 17. In addition, interior mold surface 14 may include relatively shallow (e.g., relative to raised portions 23 and recessed portions 26) raised and/or recessed patterns (not shown), such as grooves, for purposes of providing the surface of the molded article with texture and/or molded-in indicia.

Molds assembly 3 also includes a second mold portion 29, having an interior mold surface 32, and a perimeter edge 35. Interior mold surface 35 of second mold portion 29 has a contour and a plurality of perforations 38 (FIG. 2). The contour of interior mold surface 32 of second mold portion 29 may include, for example, raised portions 41 and/or recessed portions 44. Interior mold surface 32 of second mold portion 29 may be a substantially recessed or female interior mold surface (as depicted), in which case, portions thereof reside substantially below (i.e., not extending outward beyond) and optionally even with, perimeter edge 35 thereof. Alternatively, interior mold surface 32 of second mold portion 29 may be a substantially raised or male interior mold surface (not depicted), in which case, a majority of interior mold surface 32 resides above (or outward relative to) perimeter edge 35 thereof. In addition, interior mold surface 32 of second mold portion 29 may include relatively shallow (e.g., relative to raised portions 41 and recessed portions 44) raised and/or recessed patterns (not shown), such as grooves, for purposes of providing the surface of the molded article with texture and/or molded-in indicia.

In an embodiment of the present invention, interior mold surface 14 of first mold portion 11 is a substantially recessed or female interior mold surface (as depicted), and interior mold surface 32 of second mold portion 29 a substantially raised or male interior mold surface (not depicted). At least some of the raised portions of interior mold surface 32 of second mold portion 29 (that extend outward beyond perimeter edge 35) are received within recessed portions of interior mold surface 14 of first mold portion 11, when the mold portions are brought/closed together.

The perimeter edge (e.g., 17 and 35) typically defines the terminal extent of the mold portion thereof (e.g., of the first 11 and second 29 mold portions) beyond which heated thermoplastic sheet, if any, extending there-beyond does not form a portion of the final molded article. Typically, thermoplastic sheet, if any, extending beyond the perimeter edge of a mold portion is removed (e.g., cut away) from the final molded article. The perimeter edges (e.g., 17 and/or 35) of the first 11 and second 29 mold portions may each independently have any suitable shape, such as rounded, polygonal, irregular or combinations thereof. As depicted in the drawings, perimeter edge 17 of first mold portion 11 is in the form of a substantially horizontal shelf having an upper surface 47 and a terminal edge 50; and perimeter edge 35 of second mold portion 29 is in the form of a substantially horizontal shelf having an upper surface 53 and a terminal edge 56.

The first and second mold portions of the mold assembly and apparatus of the method of the present invention may each be independently fabricated from suitable materials that are known to the skilled artisan. Typically, the first and second mold portions are fabricated from metals, such as steel (e.g., tool steel). The interior mold surfaces (14, 32) of the first and second mold portions (11, 29), including the upper surfaces (47, 53) of the perimeter edges thereof (17, 35), may each independently be selected from polished steel surfaces, stainless steel surfaces, plated nickel surfaces, nickel/polytetrafluoroethylene surfaces and combinations thereof.

For purposes of clarity, the plurality of perforations (20 and 38) are only depicted in FIG. 2, and only over a portion of interior mold surfaces (14 and 32) of the first and second mold portions (11, 29). The perforations (e.g., 20 and/or 38) may be located over substantially the entirety of the respective interior mold surface (14, 32) or in zones (or clusters). The perforations (20 and/or 38) may be arranged substantially uniformly or non-uniformly (e.g., randomly) over the interior mold surface (14, 32). If located in zones, portions of the interior mold surface (14 and/or 32) may be free of perforations (20, 38). With each of the first 11 and second 29 mold portions, the plurality of perforations (20, 38) are in each case typically arranged (or located) uniformly over substantially the entirety of the respective interior mold surface (14, 32).

The plurality of perforations of each mold portion are typically in fluid communication with at least one vacuum apparatus, such as a vacuum pump. For example, the first and second mold portions may each be in fluid communication with a common vacuum apparatus. Alternatively, or in addition thereto, each mold portion may be in fluid communication with a separate vacuum apparatus. The vacuum apparatus or apparatae serve to draw reduced pressure down through the perforations of the first and second mold portions. Typically, the first and second mold portions each independently have at least one interior chamber (not shown) that is in fluid communication with both the plurality of perforations thereof and a separate vacuum apparatus, generally by means of a conduit interposed there-between. With reference to FIG. 4, the interior chamber (not shown) of first mold portion 11 is in fluid communication with vacuum apparatus 59 by means of conduit 62; and the interior chamber (not shown) of second mold portion 29 is in fluid communication with vacuum apparatus 65 by means of conduit 68.

Reduced pressure drawn by vacuum apparatus 59 through conduit 62, results in reduced pressure being drawn controllably down through perforations 20 of interior mold surface 14 first mold portion 11. Correspondingly, reduced pressure drawn by vacuum apparatus 65 results in reduced pressure being drawn controllably down through perforations 38 of interior mold surface 32 of second mold portion 29. The conduits (62, 68) of the vacuum apparatae (59, 65) may each be fabricated from rigid materials, but are more typically each independently fabricated from a flexible material that may be reversibly coiled. The reduced pressure drawn through the perforations (14, 38) of the first and second mold portions may in each case be independently: ramped in stages with at least one pressure plateau; or drawn at the full capacity of the respective vacuum apparatus (59 or 65) from the instant it is turned on (or activated).

To assist removing the molded article from the first and second mold portions (11, 29) a gas (e.g., air) may be passed out of perforations (20, 38) of at least one mold portion at elevated pressure (i.e., at a pressure greater than ambient atmospheric pressure). To pass a gas, such as air, at elevated pressure out through the perforations (20 and/or 38), the associated vacuum apparatus (59 and/or 65) may be operated in reverse, and/or a separate pressure pump (not shown) may be used in fluid communication with the internal chamber and correspondingly perforations (20 and/or 38) of the first and/or second mold portions (11, 29). In addition, the gas passed out of perforations (20 and/or 38) may be cooled to a temperature less than ambient temperature (e.g., a temperature less than 25° C., such as 5° C. to 15° C.) to further assist cooling the respective profiled thermoplastic sheet in contact with the interior mold surface thereof (14, 32), such that it retains the contour shape of the respective interior mold surface (14, 32).

The plurality of perforations (20, 38) in the interior mold surfaces (14, 32) of the first and second mold portions may independently have any suitable shape and dimension, provided they: (i) are not fouled, occluded or otherwise clogged with thermoplastic material when the molded article is removed from the first and second mold portions; and (ii) do not result in undesirable surface features or defects on the final molded article (e.g., plastic nubs extending from a surface thereof). The perforations of each interior mold surface may each independently have cross-sectional shapes selected from polygonal shapes (e.g., triangles, rectangles, squares, pentagons, hexagons, heptagons, octagons, etc., and combinations thereof), circles, ovals, irregular shapes, and combinations thereof. Typically, the perforations (20, 38) of each interior mold surface (14, 32) in each case have substantially circular cross-sectional shapes having diameters of from 0.1 mm to 7 mm, more typically from 0.5 mm to 5 mm, and further typically from 1 mm to 3 mm. In an embodiment of the present invention, the perforations (20, 38) of each interior mold surface (14, 32) in each case have substantially circular cross-sectional shapes having diameters of 1.6 mm (1/16 inch).

The first and second mold portions are reversibly positionable so as to reversibly position in facing opposition, the interior mold surface of the first mold portion and the interior mold surface of the second mold portion. To achieve such reversible positioning, the first and second mold portions may be hinged together, in each case, along at least a portion of a common edge thereof. Alternatively, one or both of the first and second mold portions may be physically picked up, transported and positioned (e.g., manually and/or by means of one or more lift devices, such as over-head cranes) so as to place the interior mold surfaces thereof in facing opposition. In a particular embodiment of the present invention, the first and second mold portions are each positioned between and rotatabley connected to laterally spaced longitudinal supports, as will be discussed in further detail herein. Rotation of the first and second mold portions about their respective lateral axes, places the interior mold surfaces thereof in facing opposition, as will be discussed in further detail herein.

In the method of the present invention, a heated first thermoplastic sheet is formed from a first thermoplastic composition. The heated first thermoplastic sheet has a temperature that renders it thermoformable (e.g., a thermoformable temperature). The heated first thermoplastic sheet has a first surface and a second surface. The method of the present invention also involves forming a heated second thermoplastic sheet from a second thermoplastic composition. The heated second thermoplastic sheet has a temperature that renders the heated sheet thermoformable (e.g., a thermoformable temperature). The heated second thermoplastic sheet has a first surface and a second surface.

The first and second thermoplastic compositions may each be independently processed by art-recognized means, which typically involve melt mixing/compounding one or more thermoplastic materials (e.g., one or more polyolefins, such as polyethylene) with one or more optional additives (e.g., heat and/or UV stabilizers) in a suitable device (e.g., a kettle or extruder, such as a single- or twin-screw co-/counter-rotating extruder). Melt mixing of the first and second thermoplastic compositions results in formation of first and second molten thermoplastic compositions. The first and second thermoplastic compositions may be the same or different, and may be processed within separate melt mixing devices (e.g., in two separate extruders), or within a single melt mixing device. Accordingly, the resulting related first and second molten thermoplastic compositions, and resulting first and second heated thermoplastic sheets may have substantially the same composition, or different compositions.

The first and second heated thermoplastic sheets may each be independently formed from the respective first and second molten thermoplastic compositions by art-recognized methods. Typically, the first and second molten thermoplastic compositions are passed substantially concurrently through separate sheet slots, so as to form the first and second heated thermoplastic sheets. The separate sheet slots may reside within separate sheet dies, or in a single sheet die, as will be discussed in further detail herein. In addition, the sheet die or dies that define the sheet slots may be a dynamic sheet die or dies having a plurality of individually controllable gates that serve to define the width and thickness of the sheet slots, as will be discussed in further detail herein.

With reference to FIG. 4, mold apparatus 1 includes a single sheet die 72 having separate laterally spaced sheet slots, or sheet slot portions (not visible) from which heated first thermoplastic sheet 75 and heated second thermoplastic sheet 78 separately emerge. Heated first thermoplastic sheet 75 has a first surface 81 and a second surface 84 (not visible in FIGS. 4-10). Heated second thermoplastic sheet 78 has a first surface 87 and a second surface 90 (not visible in FIGS. 4-10).

Figure 13:
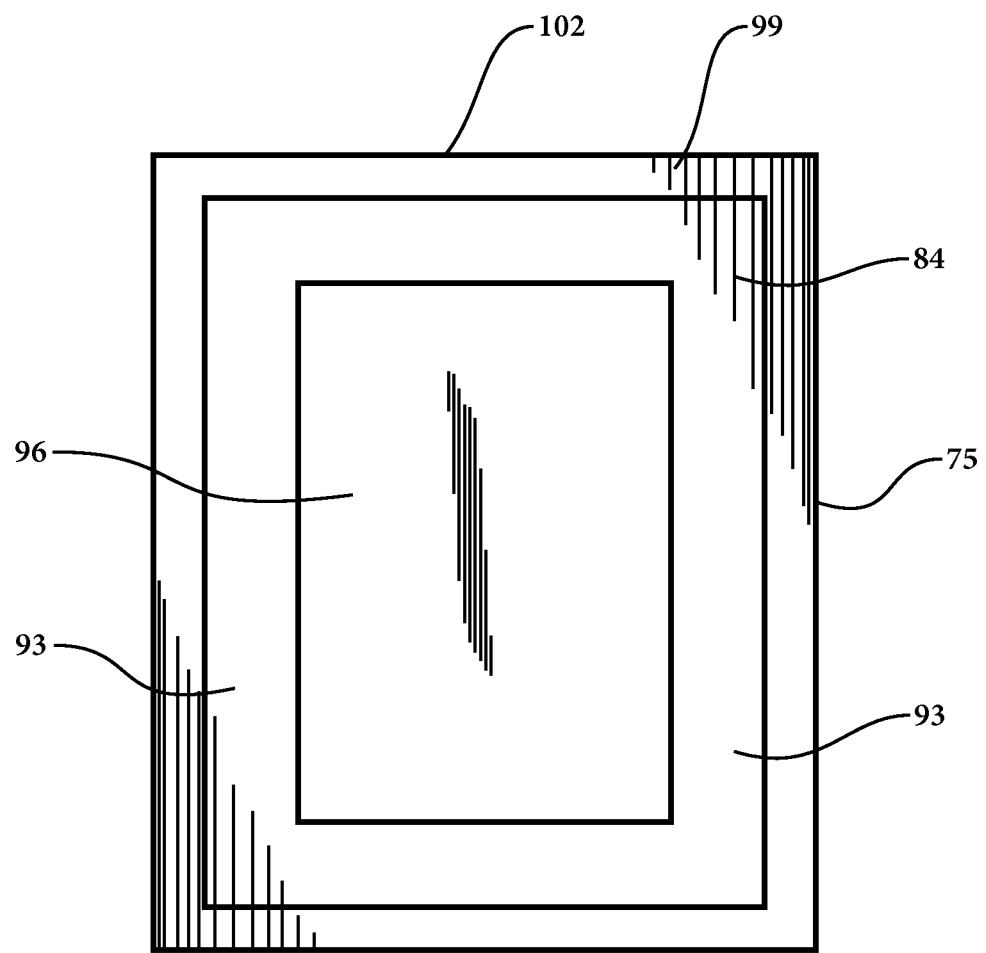
FIG. 13 is a representative elevational view of the second surface of a heated first thermoplastic sheet of the present method, showing the first, second and third portions thereof.

For purposes of illustration, and with reference to FIG. 13, second surface 84 of heated first thermoplastic sheet 75 is depicted as having representatively a first portion 93, a second portion 96, a third portion 99 and terminal edges 102. Third portion 99 of second surface 84 of heated first thermoplastic sheet 75 is located generally near or towards the terminal edges 102 of sheet 75. Second portion 96 of second surface 84 is located generally in a central area of heated first thermoplastic sheet 75. First portion 93 of second surface 84 is located generally in an area between (e.g., interposed between) third portion 99 and second portion 96 of heated first thermoplastic sheet 75. The first surface 81 also may be similarly described as having first 93, second 96 and third 99 portions that are on the opposite side (i.e., on first surface 81) relative to second surface 84 of heated first thermoplastic sheet 75. In addition, the heated first thermoplastic sheet 75 may be described more generally as having first 93, second 96 and third 99 portions corresponding to those portions as depicted in FIG. 13.

Figure 19:
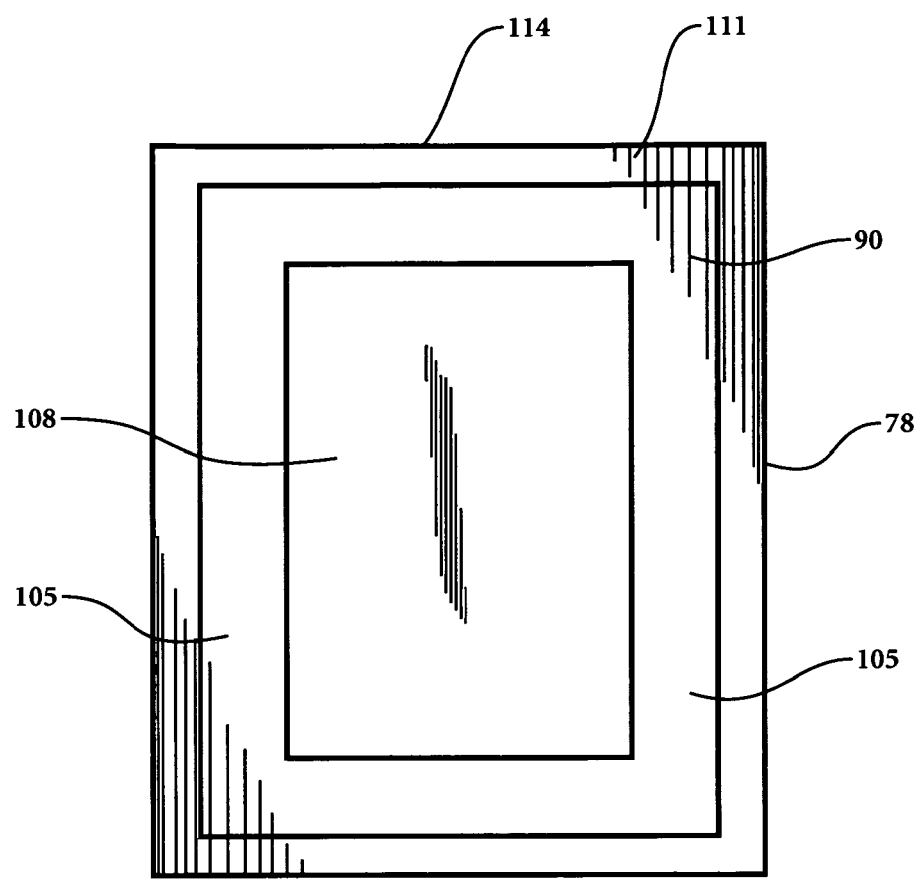
FIG. 19 is a representative elevational view of the second surface of a heated second thermoplastic sheet of the present method, showing the first, second and third portions thereof.

For purposes of further illustration, and with reference to FIG. 19, second surface 90 of heated second thermoplastic sheet 78 is depicted as having representatively a first portion 105, a second portion 108, a third portion 111 and terminal edges 114. Third portion 111 of second surface 90 of heated second thermoplastic sheet 78 is located generally near or towards the terminal edges 114 of sheet 78. Second portion 108 of second surface 90 is located generally in a central area of heated second thermoplastic sheet 78. First portion 105 of second surface 90 is located generally in an area between (e.g., interposed between) third portion 111 and second portion 108 of heated second thermoplastic sheet 78. The first surface 87 also may be similarly described as having first 105, second 108 and third 111 portions that are on the opposite side (i.e., on first surface 87) relative to second surface 90 of heated second thermoplastic sheet 78. In addition, the heated second thermoplastic sheet 78 may be described more generally as having first 105, second 108 and third 111 portions corresponding to those portions as depicted in FIG. 19.

The heated first and second thermoplastic sheets each have a temperature that allows it to be thermoformable (e.g., a thermoformable temperature). In particular, the heated first thermoplastic sheet has a temperature that allows it to be thermoformable when: (i) the first portion of the second surface of the heated first thermoplastic sheet is contacted with the perimeter edge of the first mold portion; and (ii) the second portion of the second surface of the heated first thermoplastic sheet is drawn into contour matching contact with the interior mold surface of the first mold portion. Further particularly, the heated second thermoplastic sheet has a temperature that allows it to be thermoformable when: (i) the first portion of the second surface of the heated second thermoplastic sheet is contacted with the perimeter edge of the second mold portion; and (ii) the second portion of the second surface of the heated second thermoplastic sheet is drawn into contour matching contact with the interior mold surface of the second mold portion. The temperature of the heated first and second thermoplastic sheets may each independently be equal to or greater than the melting point of the respective thermoplastic sheet. More typically, the temperature of the heated first and second thermoplastic sheets is in each case independently equal to or greater than the softening point (or glass transition temperature) of the respective thermoplastic sheet, and less than the melting point of the respective thermoplastic sheet.

In an embodiment of the method of the present invention, the heated first and second thermoplastic sheets each have an interior portion that is interposed between the first and second surfaces of the respective heated first/second thermoplastic sheets. The temperature of the heated first and second thermoplastic sheets, in this embodiment, is in each case substantially uniform (e.g., varying by less than or equal to 2° C. or 1° C.) through the first surface, the interior portion and the second surface of each heated thermoplastic sheet thereof.

The temperature of the heated first and second thermoplastic sheets may in each case be determined by art-recognized methods, such as contacting thermocouples with the first and second surfaces of the heated thermoplastic sheet, and inserting a thermocouple into the interior portion of the heated thermoplastic sheet. Alternatively, or in addition thereto, remote temperature sensors, such as an infrared sensor, may be used to determine the temperature of the first and second surfaces of the heated first and second thermoplastic sheets.

As used herein and in the claims, the term "sheet(s)" and similar terms, such as "sheet die(s)" and "heated first/second thermoplastic sheet(s)" are inclusive of the term "film(s)," and similar terms, such as "film die(s)" and "heated thermoplastic film(s)". Upon emerging from the sheet die, and more particularly the slot or slot portions of the sheet die(s), the heated first and second thermoplastic sheets each typically and independently have a thickness of from 0.5 mm to 25 mm, more typically from 1.5 mm to 15 mm, and further typically from 6 mm to 12 mm. In an embodiment of the present invention, upon emerging from the slot or slot portions of the sheet die(s), the heated first and second thermoplastic sheets each have a thickness of 9 mm. During the process of extending the heated first and second thermoplastic sheets over and bringing them each into contour matching contact with the interior mold surface of the first and second mold portions, the thickness of the heated first and second thermoplastic sheets is in each case typically reduced (relative to the heated thermoplastic sheet upon emerging from each sheet die slot). The first and second profiled/shaped thermoplastic sheets that form the molded article prepared by the method of the present invention, each typically and independently have a thickness of from 0.25 mm to 12.5 mm, more typically from 0.75 mm to 8 mm, and further typically from 3 mm to 6 mm. In an embodiment of the present invention, the first and second profiled thermoplastic sheets of the molded article prepared by the method of the present invention each have an average thickness of 4.5 mm.

The heated first and second thermoplastic sheets formed in the course of the method of the present invention may each have any suitable width and length. Since the heated first and second thermoplastic sheets are each typically formed by means of a sheet die, the width of each thereof typically depends on and is limited by the width of the sheet die, and more particularly the width of the sheet slot(s) or sheet slot portions of the sheet die(s). The heated first and second thermoplastic sheets may each independently have a width of, for example, from 2.5 cm to 5 meters, or from 31 cm to 3 meters, or from 61 cm to 2 meters. The heated first and second thermoplastic sheets may each have any suitable length, since they are each typically formed continuously in the method of the present invention. For example, the heated first and second thermoplastic sheets may each independently have a length of from 31 cm to 10 meters, or from 61 cm to 2 meters. In a particular embodiment of the present invention, the heated first and second thermoplastic sheets each have: a width of equal to or less than 3.3 meters (about 11 feet), such as 1.5 meters (about 5 feet); and a length of equal to or less than 3.3 m (about 11 feet), such as 1.5 meters (about 5 feet).

The heated first and second thermoplastic sheets may each independently be selected from heated single layer thermoplastic sheets comprising a single thermoplastic layer and optionally at least one non-thermoplastic layer. The non-thermoplastic layers of the heated single layer thermoplastic sheets may each be selected independently from, for example, metal foils, thermoset polymeric layers (e.g., one or more cured coating layers) and/or paper.

In an embodiment, the heated first thermoplastic sheet is a heated first multilayered thermoplastic sheet having at least two thermoplastic layers, and optionally at least one non-thermoplastic layer; and/or the heated second thermoplastic sheet is a heated second multilayered thermoplastic sheet having at least two thermoplastic layers, and optionally at least one non-thermoplastic layer. The two or more thermoplastic layers may each be formed from a separate thermoplastic composition, or the same thermoplastic composition. For example, each thermoplastic composition may be melt compounded so as to form separate molten thermoplastic compositions that are each separately fed into a multilayer sheet die, in accordance with art-recognized methods. The multilayer sheet die forms a heated multilayer thermoplastic sheet from the molten thermoplastic compositions fed therein. Each non-thermoplastic layer of the heated multilayered thermoplastic sheets may be selected independently from, for example, metal foils, thermoset polymeric layers (e.g., one or more cured coating layers) and/or paper.

The heated single layer and multilayered thermoplastic sheets may be provided with one or more non-thermoplastic layers by art-recognized methods. For example, a metal foil may be applied (e.g., from a roll of metal foil) to a surface of a heated thermoplastic sheet as it is formed, or interposed between two heated thermoplastic sheets as they are formed and brought together (e.g., sandwiched together).

With the heated single layer thermoplastic sheets and heated multilayered thermoplastic sheets, the contact portions (159, 162) of the first surfaces (135, 150) of the related first and second profiled thermoplastic sheets (129, 144), as will be discussed in further detail herein, are typically substantially free of non-thermoplastic layers, since non-thermoplastic layers typically inhibit fusion between the contact portions.

In the method of the present invention, as the heated first thermoplastic sheet (e.g., 75) is formed (e.g., continuously emerging from a sheet slot or sheet slot portion of a sheet die), a first portion (e.g., 93) of the second surface (e.g., 84) of the heated first thermoplastic sheet is contacted with the perimeter edge (e.g., 17) of the first mold portion (e.g., 11). Correspondingly, as the heated second thermoplastic sheet (e.g., 78) is formed (e.g., continuously emerging from a sheet slot or sheet slot portion of a sheet die), a first portion (e.g., 105) of the second surface (e.g., 90) of the heated second thermoplastic sheet is contacted with the perimeter edge (e.g., 35) of the second mold portion (e.g., 29). Contact of the heated first and second thermoplastic sheets with the perimeter edges of the respective mold portions, may be conducted sequentially, but is typically conducted substantially concurrently in the method of the present invention.

To achieve contact between the first portion of the second surface of each of the heated first and second thermoplastic sheets and the perimeter edges of the respective first and second mold portions, the first and second mold portions are each typically positioned vertically below the sheet slots of the sheet die(s) from which the heated sheets are formed. As such, the heated first and second thermoplastic sheets typically drop vertically and gravitationally downward towards the first and second mold portions as the sheets are being continuously formed. The first and second mold portions are typically each positioned within a plane, and more typically the same plane (e.g., as defined by the x- and y-axes of FIG. 4) vertically below the sheet die (e.g., 72) or dies (e.g., along the z-axis of FIG. 4).

As the heated first and second thermoplastic sheets are formed and drop vertically downward toward the first and second mold portions: (i) the first and second mold portions may be linearly moveable within a plane beneath the sheet die(s); and/or (ii) the sheet die(s) may be linearly moveable (e.g., along rails, not shown) above the first and second mold portions. Typically, the sheet die or dies are substantially stationary, and the first and second mold portions are reversibly linearly moveable within a plane beneath the sheet die or dies. With reference to FIG. 4, sheet die 72 is substantially stationary, while the first and second mold portions (11, 29) are reversibly and linearly moveable within a plane (e.g., as defined by the x- and y-axes) beneath sheet die 72, as represented by double headed arrow 117 (e.g., along the y-axis).

Mold assembly 3, which includes the first and second mold portions (11, 29) is typically supported on a platform 120, by means of a plurality of vertically upstanding support members 123. With mold assembly 3 supported thereon, platform 120 is moved linearly beneath stationary sheet die 72, in the direction represented by arrow head 126 of double headed arrow 117, which results in the first portions (93, 105) of the second surfaces (84, 90) of the heated first and second thermoplastic sheets (75, 78) contacting the perimeter edges (17, 35) of the respective first and second mold portions (11, 29). Platform 120 may be reversibly moveable in the plane beneath sheet die 72 by known locomotion means, such as skids, tracks, wheels alone, wheels in conjunction with rails, and combinations thereof (not shown). In an embodiment, platform 120 is itself or is further supported on a linearly moveable carriage (not shown) that includes one or more means of locomotion (e.g., as summarized above).

Typically, substantially the whole of the perimeter edge 17 of the first mold portion 11 is contacted with the first portion 93 of the second surface 84 of the heated first thermoplastic sheet 75, and substantially the whole of the perimeter edge 35 of the second mold portion 29 is contacted with the first portion 105 of the second surface 90 of the heated second thermoplastic sheet 78. See, for example, FIG. 5. In addition, contact between the first portion of the second surface of each heated thermoplastic sheet and the perimeter edge of each mold portion, typically results in the formation of a substantially complete (e.g., airtight) seal there-between.

With the first portion 93 of the second surface 84 of the heated first thermoplastic sheet 75 in contact with at least a portion of (and, optionally, the whole of) the perimeter edge 17 of the first mold portion 11, reduced pressure is drawn through the plurality of perforations 20 of interior mold surface 14 of first mold portion 11. This results in a second portion 96 (FIG. 13) of the second surface of the first heated thermoplastic sheet being drawn into substantial contour matching contact with the interior mold surface of the first mold portion. Such reduced pressure driven contour matching contact further results in the formation of a first profiled thermoplastic sheet 129 having a second surface 132 in contact with interior mold surface 14 of first mold portion 11, and a first surface 135 that is substantially opposed to second surface 132 of the first profiled thermoplastic sheet 129. See FIGS. 6, 7, 11 and 12. Second surface 132 of first profiled thermoplastic sheet 129 is not visible in FIGS. 6 and 7, but is visible in FIGS. 11 and 12, as it defines a portion of the exterior surface 138 of the molded article 141 formed by the method of the present invention.

Correspondingly, with the first portion 105 of the second surface 90 of the heated second thermoplastic sheet 78 in contact with at least a portion of (and, optionally, the whole of) the perimeter edge 35 of the second mold portion 29, reduced pressure is drawn through the plurality of perforations 38 of interior mold surface 32 of second mold portion 29. This results in a second portion 108 (FIG. 19) of the second surface of the second heated thermoplastic sheet being drawn into substantial contour matching contact with the interior mold surface of the second mold portion. Such reduced pressure driven contour matching contact further results in the formation of a second profiled thermoplastic sheet 144 having a second surface 147 in contact with interior mold surface 32 of second mold portion 29, and a first surface 150 that is substantially opposed to second surface 147 of the first profiled thermoplastic sheet 129. See FIGS. 6, 7, 11 and 12. Second surface 147 of second profiled thermoplastic sheet 144 is not visible in FIGS. 6 and 7, but is visible in FIGS. 11 and 12, as it defines a portion of the exterior surface 138 of the molded article 141 formed by the method of the present invention.

The step of (c) contacting the first portion of the second surface of the heated thermoplastic sheets with the perimeter edges of the mold portions; and the step of (d) drawing, via reduced pressure, the second portion of the second surface of the sheets into contour matching contact with the interior mold surfaces (so as to form the first and second profiled thermoplastic sheets), may be conducted concurrently or sequentially. In an embodiment of the present invention, the perimeter edge contacting step (c) and the profiled thermoplastic sheet formation step (d) are performed sequentially, with step (d) being performed after step (c). In a particular embodiment, the profiled thermoplastic sheet formation step (d) is performed after substantially the whole of the perimeter edge of each mold portion has been contacted with the first portion of the second surface of the heated sheet in step (c).

A combination of (i) contact of substantially the whole of the perimeter mold edge with the first portion of the second surface of the heated thermoplastic sheet, and (ii) a substantially complete seal being formed there-between, enhances drawing the second portion of the second surface of the heated thermoplastic sheet into contour matching contact with the interior mold surface by means of drawing reduced pressure through the interior mold surface perforations. Formation of a seal around the whole of the perimeter edge results in the formation of an enclosed interior mold space defined by the second portion of the second surface of the heated thermoplastic sheet and the interior mold surface. Drawing reduced pressure through the perforations of the interior mold surface results in evacuation of the defined interior mold space, and efficiently drawing the second portion of the second surface of the heated thermoplastic sheet into contour matching contact with the interior mold surface residing there-under, and corresponding formation of the respective profiled thermoplastic sheets.

Figure 7:
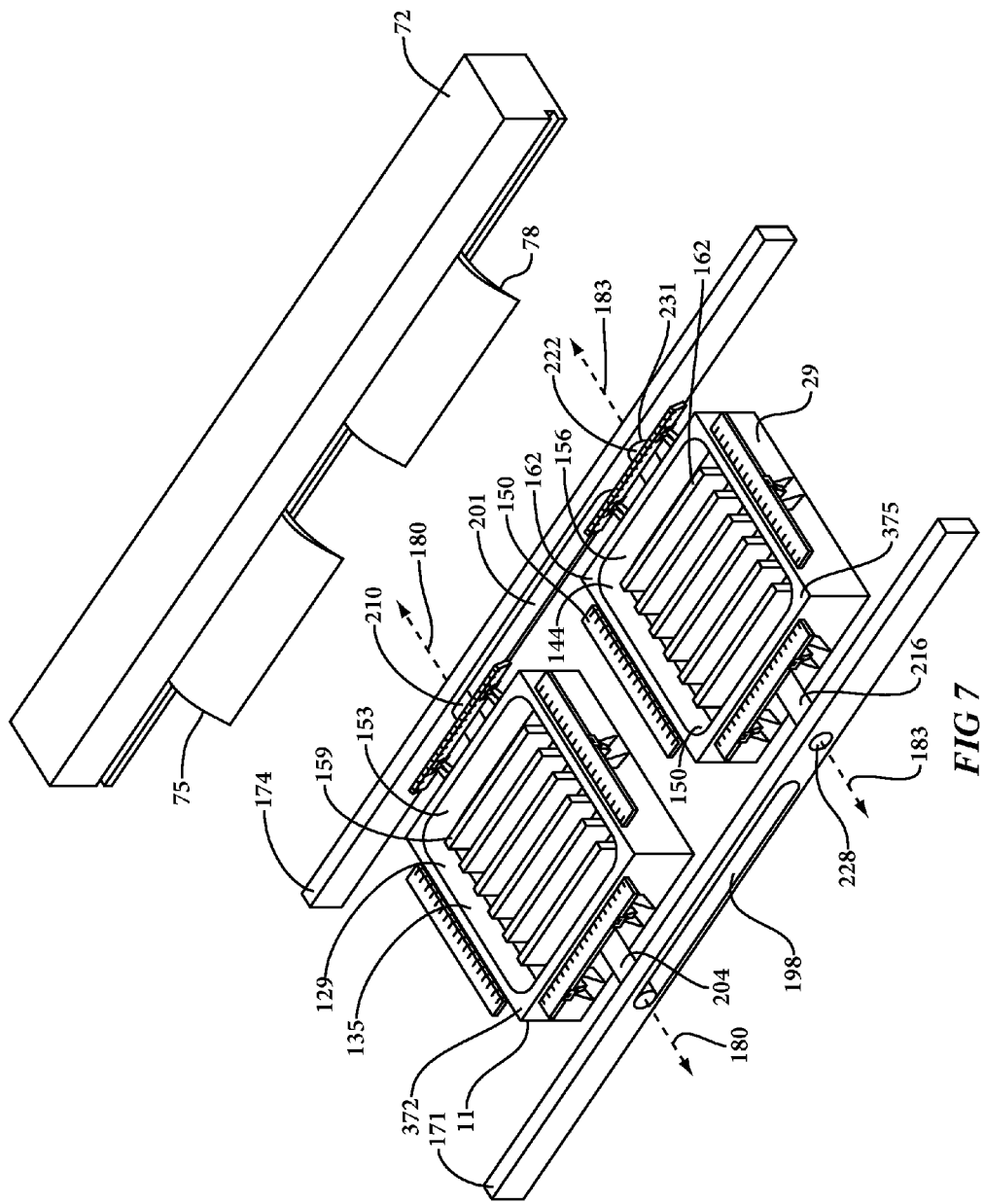
FIG. 7 is a representative perspective view of the mold apparatus of FIG. 6, in which the heated first and second thermoplastic sheets emerging from the sheet die have been separated from the first and second profiled thermoplastic sheets.

After contacting the first portion of the second surface of each heated thermoplastic sheet with the perimeter edge of the respective mold portion, and/or after forming the profiled thermoplastic sheets within the mold portions, heated thermoplastic sheet extending between the mold and the sheet die is typically separated (e.g., cut) from the sheet material that is in contact with the mold. With reference to FIG. 7, heated first thermoplastic sheet 75 (which is extending out of sheet die 72) has been separated (e.g., cut) from first profiled thermoplastic sheet 129; and heated second thermoplastic sheet 78 (which is extending out of sheet die 72) has been separated (e.g., cut) from second profiled thermoplastic sheet 144. Separation of the excess heated thermoplastic sheets from the mold portions, and in particular from the profiled thermoplastic sheets, is typically undertaken in the method of the present invention, so as to prevent the excess heated sheet portions from interfering with the subsequent mold positioning and fusion steps.

With the profiled thermoplastic sheets so formed and the second surfaces thereof in contact with the respective interior mold surfaces, the first and second profiled thermoplastic sheets in each case still retain residual heat of sheet formation. As used herein and in the claims, the term "residual heat of sheet formation" and similar terms means that each profiled thermoplastic sheet retains residual heat associated with the formation (e.g., extrusion) of the respective heated thermoplastic sheet from which the profiled thermoplastic sheet was formed. In particular, the first profiled thermoplastic sheet, while in the first mold portion, retains residual heat associated with the formation (e.g., extrusion) of the heated first thermoplastic sheet, from which the first profiled thermoplastic sheet was formed. Accordingly, the second profiled thermoplastic sheet, while in the second mold portion, retains residual heat associated with the formation (e.g., extrusion) of the heated second thermoplastic sheet, from which the second profiled thermoplastic sheet was formed.

The residual heat of sheet formation in each case has associated therewith a residual temperature, which is typically equal to or less than the temperature that renders the related heated thermoplastic sheet thermoformable. More particularly, the residual heat of sheet formation associated with the first profiled thermoplastic sheet provides a residual temperature that is at least sufficient to allow fusion of contact portions of the first profiled thermoplastic sheet with contact portions of the second profiled thermoplastic sheet. Correspondingly, the residual heat of sheet formation associated with the second profiled thermoplastic sheet provides a residual temperature that is at least sufficient to allow fusion of contact portions of the second profiled thermoplastic sheet with contact portions of the first profiled thermoplastic sheet.

After formation of the first and second profiled thermoplastic sheets, the first and second mold portions are positioned (e.g., longitudinally) towards each other. The first mold portion may be positioned (e.g., moved) towards a stationary second mold portion; or the second mold portion may be positioned towards a stationary first mold portion; or the first and second mold portions may each be positioned towards the other. Prior to, or concurrently with, positioning the first and second mold portions towards each other, the first and second mold portions may optionally be re-aligned (e.g., rotated) so as to place the first surface of the first profiled thermoplastic sheet, and the first surface of the second profiled thermoplastic sheet in facing opposition. See, for example, the rotational re-alignment of the first and second mold portions in the sequence represented by FIGS. 7 and 8.

Positioning the first and second mold portions towards each other, results in a facing portion of the first surface of the first profiled thermoplastic sheet and a facing portion of the first surface of the second profiled thermoplastic sheet to be placed in facing opposition and at the same time free of contact there-between. Positioning the first and second mold portions towards each other, also results in a contact portion (i.e., one or more contact portions) of the first surface of the first profiled thermoplastic sheet and a contact portion (i.e., one or more contact portions) of the second profiled thermoplastic sheet being brought into contact with each other.

With reference to FIG. 7, first surface 135 of first profiled thermoplastic sheet 129 has facing portions 153, and first surface 150 of second profiled thermoplastic sheet 144 has facing portions 156. First surface 135 of first profiled thermoplastic sheet 129 has contact portions 159, and first surface 150 of second profiled thermoplastic sheet 144 has contact portions 162.

Positioning the first and second mold portions towards each other may be achieved by art-recognized methods, such as manually or mechanically pushing one mold portion towards the other, or both mold portions towards each other. In an embodiment, at least one mold portion is pushed towards the other by means of one or more hydraulic or pneumatic pistons (not shown in the drawings).

Figure 9:
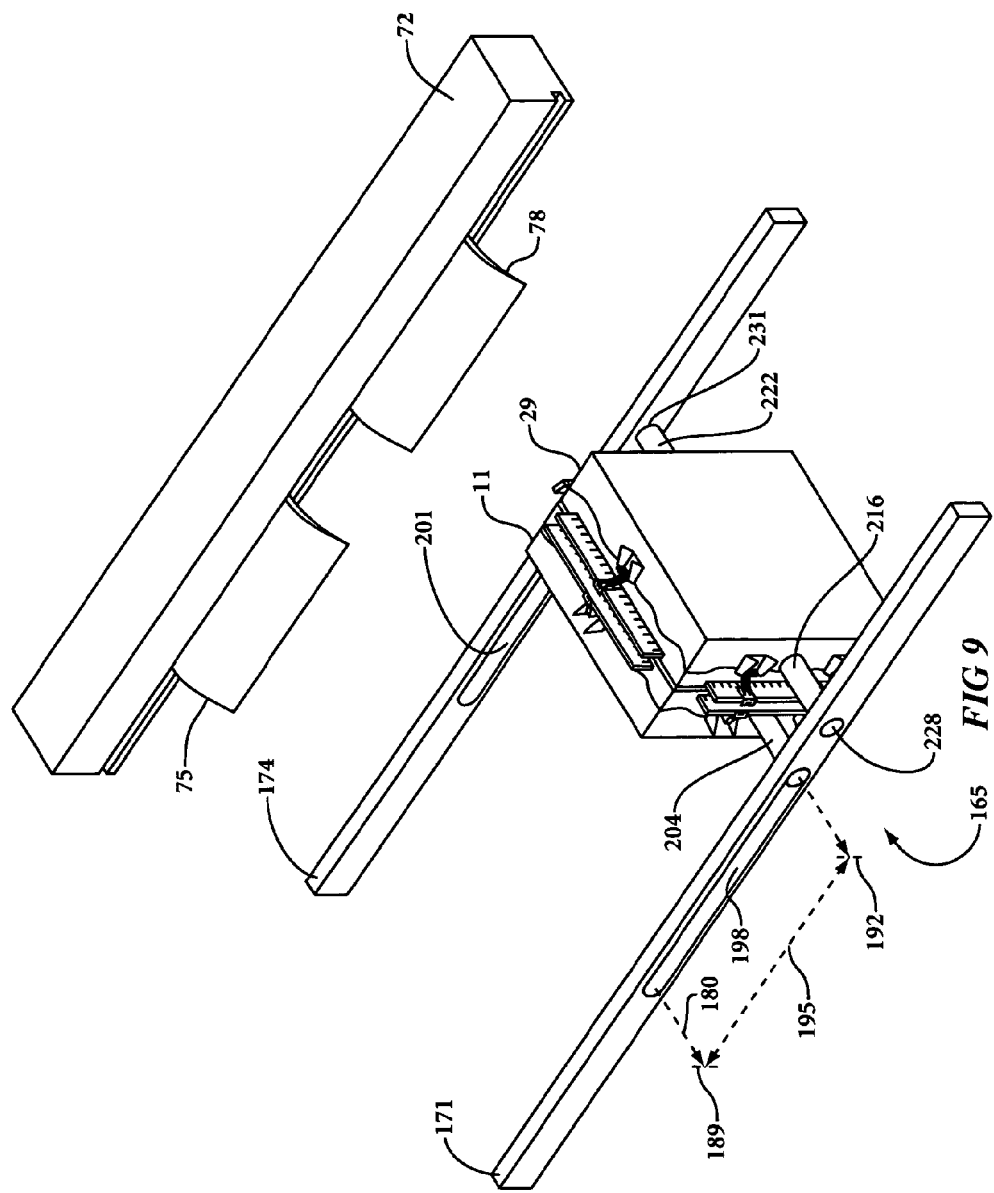
FIG. 9 is a representative perspective view of the mold apparatus of FIG. 8 in which the first and second mold portions have been longitudinally repositioned so as to bring into contact and fuse together contact portions of the first and second profiled thermoplastic sheets therein.
Figure 10:
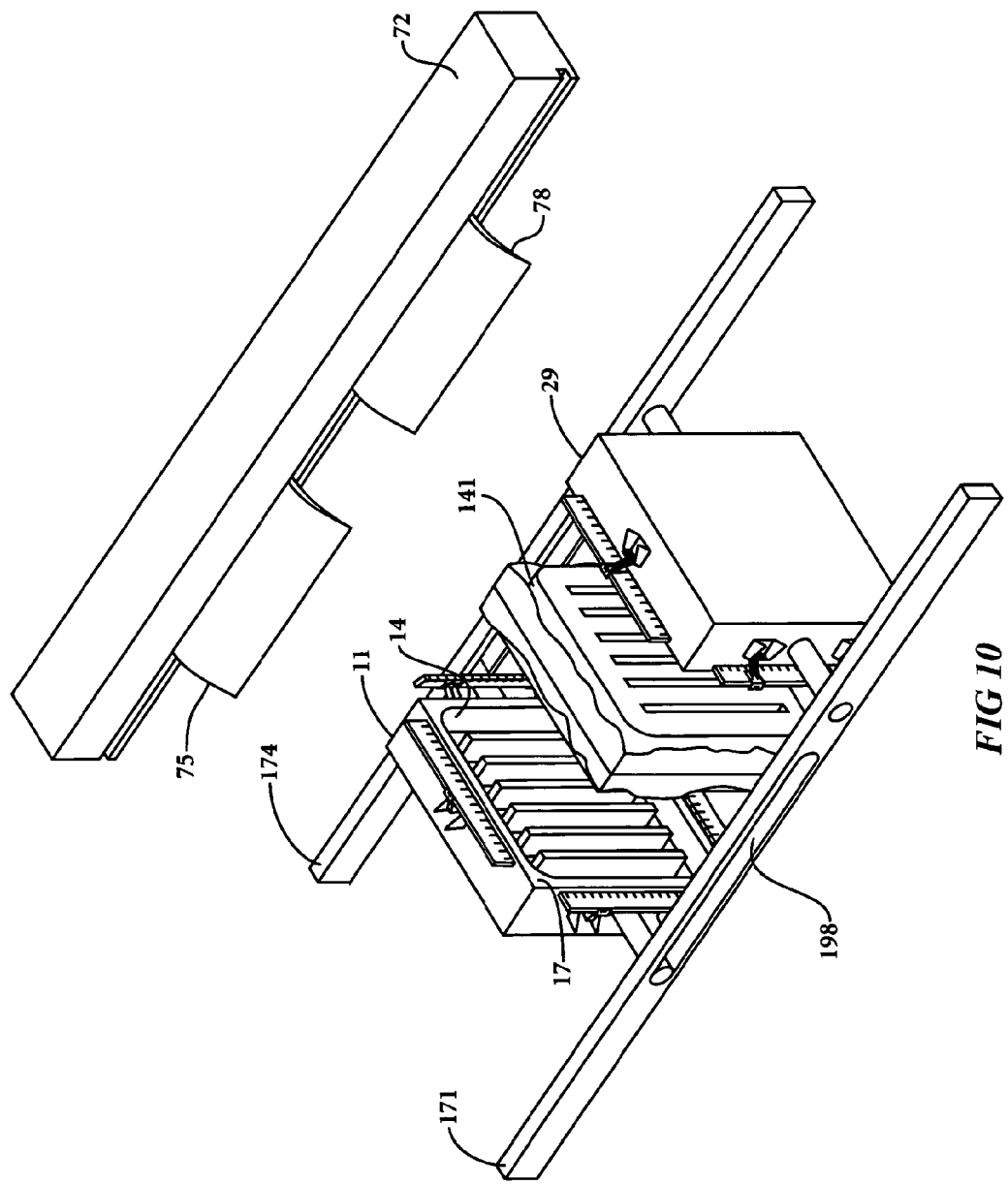

In an embodiment of the present invention, and with reference to FIG. 9, the first and second mold portions (11, 29) are positioned towards each other so as to form a closed mold 165 in which the molded article is formed. Within closed mold 165, the facing portions (153, 156) of the first surfaces (135, 150) of the first and second profiled thermoplastic sheets (129, 144) reside in facing and non-contacting opposition to each other. In addition, within closed mold 165, the contact portions (159, 162) of the first surfaces (135, 150) of the first and second profiled thermoplastic sheets (129, 144) are in contact with each other.

With the first and second mold portions so positioned toward each other, the contact portions of the first and second profiled sheets are fused together. In particular, the contact portion(s) of the first surface of the first profiled sheet and the contact portion(s) of the first surface of the second profiled sheet, which are in contact with each other, are fused together. Fusion of the contacted contact portions is achieved by means of residual heat of sheet formation, which resides in each of the first and second profiled thermoplastic sheets (as described in further detail previously herein). The contacted contact portions are fused together such that upon cooling to a temperature that is less than the melting temperature, and in particular the softening temperature or Tg of the first and second profiled thermoplastic sheets, the contacted contact portions are sufficiently fused so as to resist parting (or separating) when exposed to static and/or dynamic loads under which the molded article is intended to be operable or otherwise used.

Figure 12:
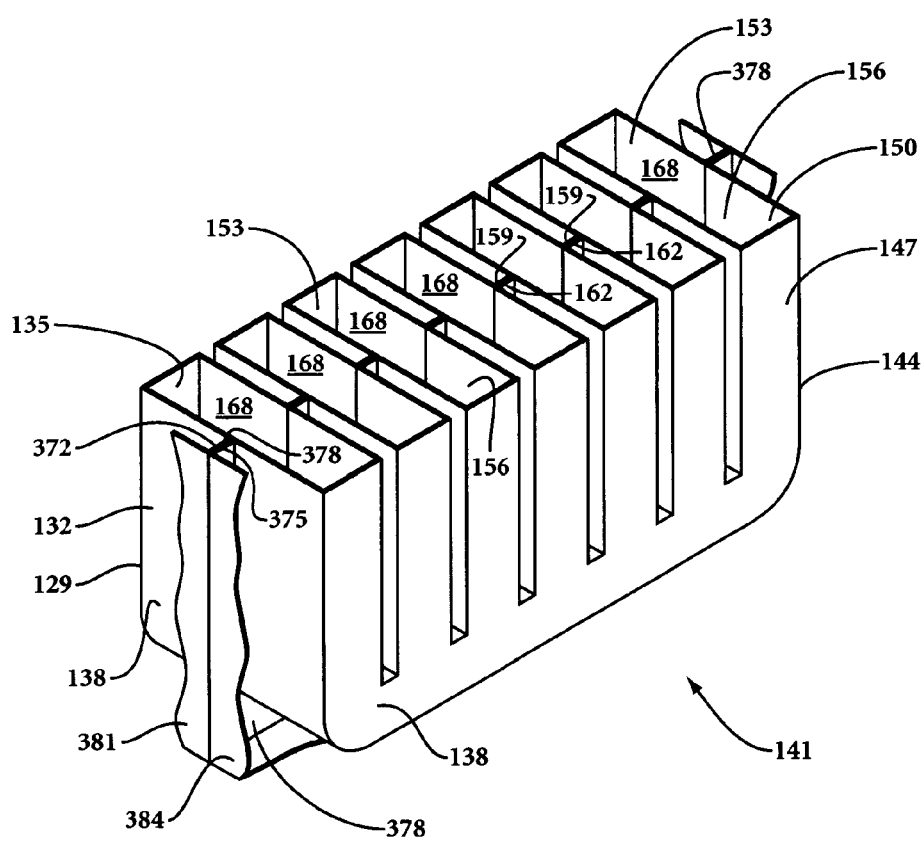
FIG. 12 is a representative sectional perspective view of the molded article of FIG. 11 showing the fused contact portions and interior spaces thereof.

For purposes of illustration, and with reference to FIG. 12, contact portions 159 of first surface 135 of first profiled thermoplastic sheet 129 are in contact and fused together with contact portions 162 of first surface 150 of second profiled thermoplastic sheet 144. The contacted and fused contact portions (159, 162) are depicted in FIG. 12 with well defined lines, for purposes of illustration. The contacted and fused contact portions may be substantially free of well defined lines there-between or within, depending, for example, on the conditions under which fusion is conducted and/or the materials from which the first and second profiled thermoplastic sheets are fabricated.

In an embodiment, the method of the present invention further includes compressing the contacted contact portions together, under conditions of elevated pressure, substantially concurrently with the step of fusing the contacted contact portions together. More particularly, the method may further include: compressing together, under conditions of elevated pressure, the contact portion of the first surface of the first profiled thermoplastic sheet and the contact portion of the first surface of the second profiled thermoplastic sheet; substantially concurrently with, fusing together the contact portion of the first surface of the first profiled thermoplastic sheet and the contact portion of the first surface of the second profiled thermoplastic sheet. Elevated pressure may be applied during the concurrent compression step by art-recognized methods (e.g., by means of one or more hydraulic and/or pneumatic pistons). With reference to FIG. 9, for example, a pneumatic piston (not shown) abutting against the back or underside of first mold portion 11, drives first mold portion 11 compressively against second mold portion 29, which is stationary, and thus the contacted contact portions of the first and second profiled thermoplastic sheets are concurrently fused and pressed together under conditions of elevated pressure.

While any suitable compressive force may be applied to the contacted contact portions during the fusion step, a relatively low compressive force is typically required (e.g., less than 6895 kPa/1000 psi, and more typically less than or equal to 689 kPa/100 psi). The contacted contact portions of the first and second profiled thermoplastic sheets are typically compressed together during the fusion step under a compressive force of 97 kilopascals ("kPa") to 393 kPa (14 to 57 psi), more typically from 117 kPa to 193 kPa (17 to 28 psi), and further typically from 131 kPa to 186 kPa (19 to 27 psi). In an embodiment, the contacted contact portions of the first and second profiled thermoplastic sheets are typically compressed together during the fusion step under a compressive force of 145 kPa (21 psi).

Fusing together the contacted contact portions of the first and second profiled sheets, within the closed first and second mold portions (e.g., closed mold 165, FIG. 9) results in the formation of a fused and profiled multisheet article (not visible in the drawings) within the closed mold. The fused and profiled multisheet article typically has a temperature that is greater than the softening temperature or Tg of the first and second profiled thermoplastic sheets.

Figure 11:
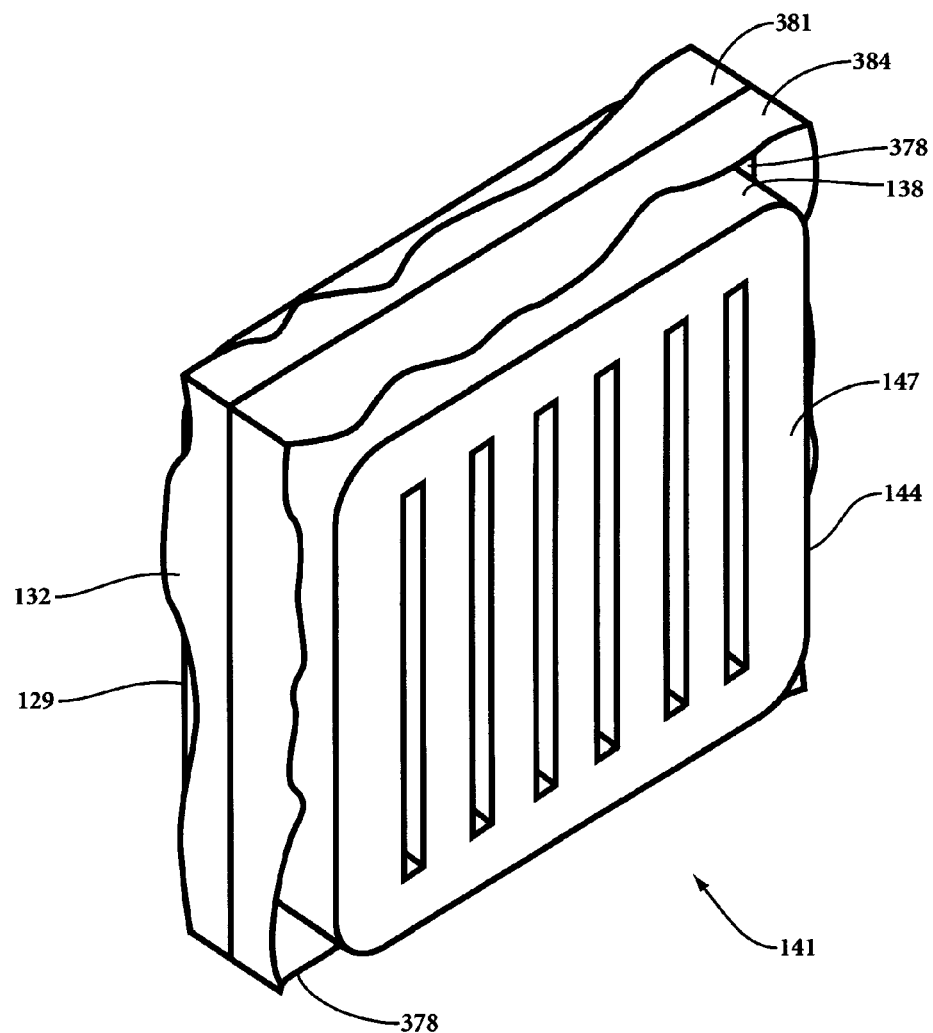
FIG. 11 is a representative enlarged perspective view of the molded article of FIG. 10 alone.

The fused and profiled multisheet article is then cooled so as to result in formation of the molded article (e.g., molded article 141 of FIGS. 11 and 12). The fused and profiled multisheet article is typically cooled to a temperature that is less than the softening temperature or Tg of the first and second profiled thermoplastic sheets (e.g., being cooled to ambient room temperature, such as 23° C. to 27° C.). The fused and profiled multisheet article may be cooled within the closed mold, and/or removed therefrom and cooled outside of the closed mold. Typically, the fused and profiled multisheet article is cooled within the closed mold, and then the closed mold is opened and the molded article removed or separated therefrom. See, for example FIG. 10. When cooled within the closed mold (e.g., closed mold 165), one or both of the first and second mold portions (11, 29) may include interior conduits (not shown) in abutment with the underside of the interior mold surfaces thereof. A chilled heat exchange fluid is passed through the interior conduits, so as to cool the interior mold surfaces and correspondingly the fused and profiled multisheet article that is in abutment with the interior mold surfaces of the first and second mold portions.

The facing portions of the first surface of the first profiled thermoplastic sheet, and the facing portions of the first surface of the second profiled thermoplastic sheet (which are substantially free of contact there-between) together define an interior space of the molded article. With reference to FIG. 12, facing portions 153 of first surface 135 of first profiled thermoplastic sheet 129, and facing portions 156 of first surface 150 of second profiled thermoplastic sheet 144 (which are free of contact there-between) together define one or more, and as depicted in FIG. 12, a plurality, of interior spaces 168 within molded article 141.

The interior space(s) of the molded article prepared by the method of the present invention may be partially open or substantially fully enclosed. For example, one or more apertures (not shown) may be drilled or punched through the first and/or second profiled thermoplastic sheets of the molded article, e.g., in a post-molding operation. Alternatively or in addition thereto, one or more apertures may be formed in the first and/or second profiled thermoplastic sheets during the molding process of the present invention, e.g., by means of one or more removable cores (not shown) retractably extending from the interior mold surfaces. In an embodiment, the interior space(s) of the molded article is a substantially enclosed interior space(s), as depicted in the drawings (e.g., FIGS. 11 and 12).

The interior spaces of the molded article may be filled with any suitable material, such as gasses, liquids, gels and/or solids. For example, the interior spaces of the molded article may be filled with a gas, such as air, or a liquid, such as water. In an embodiment, at least some of the interior spaces of the molded article are filled with a polymeric foam, such as an injected closed-cell polyurethane foam. Gasses, liquids, gels and/or solids may be introduced into the interior spaces during and/or after the molding process, in accordance with art-recognized methods. For example, an expandable polyurethane foam composition may be introduced into the interior spaces in a post-molding operation by means of an injection nozzle inserted through a sidewall of the molded article.

In the method of the present invention, fusion between the contacted contact portions of the first and second profiled thermoplastic sheets is achieved by means of the residual heat of sheet formation residing in each of the first and second profiled thermoplastic sheets, as described previously herein. In a particular embodiment, fusion between the contacted contact portions of the first and second profiled thermoplastic sheets is achieved exclusively by means of the residual heat of sheet formation residing in each of the first and second profiled thermoplastic sheets. In this embodiment, the method is free of heating (i.e., introducing additional thermal energy) into the heated first thermoplastic sheet after its formation from the first thermoplastic composition (e.g., by extrusion); and is free of heating (i.e., introducing additional thermal energy) into the heated second thermoplastic sheet after its formation from the second thermoplastic composition (e.g., by extrusion). For example, the method is free of: passing the heated first and second thermoplastic sheets over or through one or more heated rollers; and/or exposing the heated first and second thermoplastic sheets to a radiant heat source, such as one or more infrared heaters. More particularly, the method in this embodiment, is also free of heating (i.e., introducing additional thermal energy) into the first and second profiled sheets prior to and during fusing together the contacted contact portions thereof. For example, the method is free of heating the interior mold surfaces of the first and second mold portions prior to and during the fusion step.

In an embodiment of the present invention, the contact portion of the first surface of the first profiled thermoplastic sheet includes a first flanged contact area, that is defined by (or, equivalently, formed over) at least a portion of the perimeter edge of the first mold portion. In addition, the contact portion of the first surface of the first surface of the second profiled thermoplastic sheet includes a second flanged contact area, that is defined by (or equivalently, formed over) at least a portion of the perimeter edge of the second mold portion. In the method of the present invention, fusing together the first flanged contact area and/with the second flanged contact area results in the formation of a fused flange that extends substantially outward from an exterior surface of the molded article.

With reference to FIGS. 1, 2 and 7, the contact portion(s) 159 of first surface 135 of first profiled thermoplastic sheet 129 has a first flanged contact area 372 this is defined by and formed over at least a portion of, and as depicted substantially all of, perimeter edge 17 of first mold portion 11. The contact portion(s) 162 of first surface 150 of second profiled thermoplastic sheet 144 has a second flanged contact area 375 that is defined by and formed over at least a portion of, and as depicted substantially all of, perimeter edge 35 of second mold portion 29.

With reference to FIGS. 11 and 12, fusing the contact portions of the first and second profiled thermoplastic sheets in the method of the present invention, includes fusion of first flanged contact area 372 and second flanged contact area 375 together, which results in formation of a fused flange 378 that extends outward from a portion (e.g., a side or sidewall portion) of exterior surface 138 of molded article 141. As depicted in the drawings, fused flange 378 extends outward from, and is substantially orthogonal relative to, exterior surface 138 of molded article 141. Fused flange 378 may form any angle relative to the exterior surface (or portion thereof) from which the fused flange extends outward from (e.g., forming an angle of from greater than 0° to 90°).

As depicted in the drawings, fused flange 378 has excess flange portions 381 and 384 extending laterally outward from terminal portions thereof. Excess flange portions 381 and 384 are formed from portions of the first and second profiled thermoplastic sheets that extend beyond the terminal edges of the perimeter edge and over the exterior surfaces of the respective first and second mold portions. For example, first excess flange portion 381 is formed by a portion of first profiled thermoplastic sheet 129 that extends beyond terminal edge 50 of perimeter edge 17, and over a portion of the exterior surface (e.g., exterior sidewall 207) of first mold portion 11. Second excess portion 384 is formed by a portion of second profiled thermoplastic sheet 144 extending beyond terminal edge 56 of perimeter edge 35, and over a portion of the exterior surface (e.g., exterior sidewall 219) of second mold portion 29.

The fused flange (378) and/or the excess flange portions (381, 384) may be used to assist in transferring molded article 41 to one or more post-molding operations (e.g., sanding, drilling, punching and/or coating operations) without damaging (e.g., scratching or abrading) the exterior surfaces (e.g., 138) of the molded article. While the excess flange portions (e.g., 381, 384) may be left on the molded article, they are more typically removed in one or more post-molding operations (e.g., by cutting or sawing). In addition, the fused flange (e.g., 378) of the molded article may optionally be removed in one or more post-molding operations.

The mold apparatus, and more particularly the mold assembly of the mold apparatus of the present invention further includes, in an embodiment, a first longitudinal support and a second longitudinal support that are laterally spaced relative to each other. The first and second mold portions reside between and are each rotationally attached to each of the first and second longitudinal supports. Rotational attachment to the first and second longitudinal supports allows each of the first and second mold portions to be rotated about their respective lateral axes. In addition, the first mold portion and/or the second mold portion is reversibly longitudinally positionable between the first and second longitudinal supports.

With reference to FIGS. 1 and 2, mold assembly 3 includes a first longitudinal support 171 and a second longitudinal support 174, that are laterally spaced from each other. The first and second longitudinal supports (171, 174) are laterally spaced from each other so as to have a lateral distance 177 there-between that allows the first and second mold portions to reside and be rotatable there-between.

First mold portion 11 is rotationally attached to first longitudinal support 171 and second longitudinal support 174 so as to be reversibly rotatable about a lateral axis 180 of the first mold portion. Second mold portion 29 is rotationally attached to first longitudinal support 171 and second longitudinal support 174 so as to be reversibly rotatable about a lateral axis 183 of the second mold portion.

Rotational attachment of the first and second mold portions to the first and second longitudinal supports may be achieved by suitable means, such as fixed pins extending laterally outward from opposing sides of the mold portions, and into dimensioned recesses of the first and second longitudinal supports. Alternatively, or in addition thereto, fixed pins may extend laterally inward from the first and second longitudinal supports, and into dimensioned recesses in opposing sides of the respective mold portions.

Reversible longitudinal positioning of the first and/or second mold portions between the first and second longitudinal supports may be achieved by sliding and/or intermeshing gear means. For example, pins extending laterally outward from opposing sides of the first and/or second mold portions may engage slidingly with the first and second longitudinal supports. Alternatively, pins extending laterally outward from opposing sides of the first and/or second mold portions may include toothed sprockets that engage intermeshingly with linear gear tracks fixed to the first and second longitudinal supports.

With the mold assembly of the mold apparatus of the present invention including first and second longitudinal supports (e.g., 171 and 174) as described above, the method of the present invention further includes the following steps. The first mold portion (e.g., 11) is rotated reversibly about its lateral axis (e.g., 180), and the second mold portion (e.g., 29) is rotated reversibly about its lateral axis (e.g., 183) so as to place the first surface (e.g., 135) of the first profiled thermoplastic sheet (e.g., 129) and the first surface (e.g., 150) of the second profiled thermoplastic sheet (e.g., 144) in facing opposition relative to each other. See the rotational sequence as depicted in FIGS. 7 and 8.

The first and second mold portions may be rotated about their lateral axes through any angle so as to bring the first surfaces of the first and second profiled thermoplastic sheets into facing and separated opposition. Typically, the first and second mold portions are each independently rotated through an angle of less than 360°, and more typically less than or equal to 180°. As depicted in FIGS. 7 and 8, the first and second mold portions (11, 29) are each rotated towards each other around their respective lateral axes (180, 183) through an angle of substantially 90°.

Figure 8:
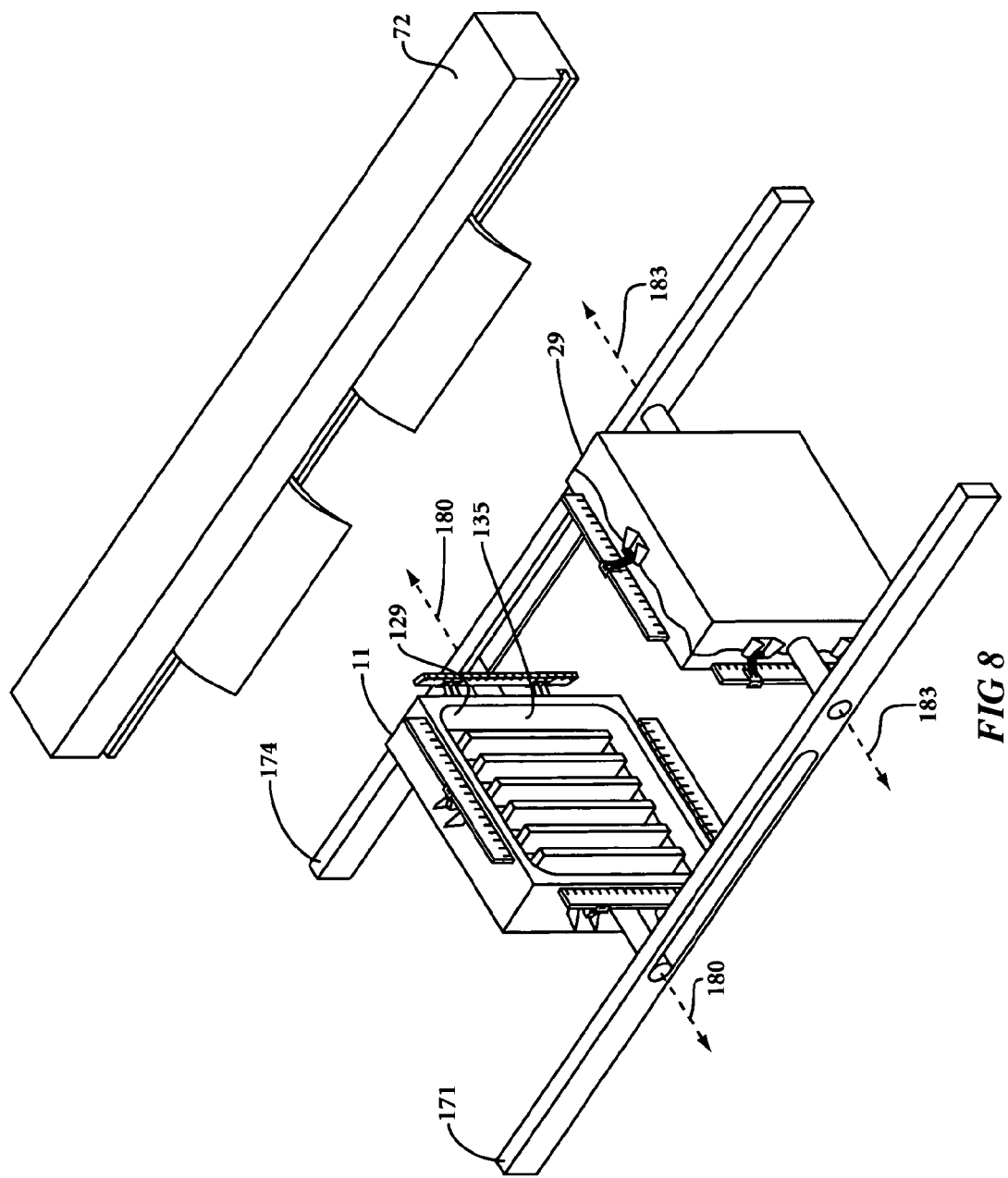
FIG. 8 is a representative perspective view of the mold apparatus of FIG. 7 in which the first and second mold portions have each been rotated so as to place the first surfaces of the first and second profiled thermoplastic sheets therein in facing opposition.

With the first and second mold portions (11, 29) rotated about their lateral axes (180, 183) so as to place the first surfaces (135, 150) of the first and second profiled thermoplastic sheets (129, 144) in facing opposition (e.g., as depicted in FIG. 8), the first and/or second mold portions are then positioned (or moved) longitudinally towards each other, between the first and second longitudinal supports (171, 174). Longitudinal positioning of the first and/or second mold portions between the first and second longitudinal supports results in: (i) the facing portions (153, 156) of the first and second profiled thermoplastic sheets (129, 144) being placed in facing opposition in the absence of contact there-between; and (ii) the contact portions (159, 162) of the first and second profiled thermoplastic sheets (129, 144) being placed in contact with each other, as discussed in further detail previously herein.

In an embodiment, and with reference to FIG. 9, first mold portion 11 is positioned longitudinally from a first position 189 to a second position 192, as indicated by arrow 195, towards second mold portion 29, which is longitudinally stationary, so as to bring the first and second mold portions together to form closed mold 165. Within closed mold 165: (i) the facing portions (153, 156) of the first and second profiled thermoplastic sheets (129, 144) are in facing and non-contacting opposition; and (ii) the contact portions (159, 162) of the first and second profiled thermoplastic sheets (129, 144) are placed in contact with each other.

Rotational and/or longitudinal attachment between the first and second mold portions, and the first and second longitudinal supports may be achieved, in an embodiment of the present invention, by a combination of providing the longitudinal supports with at least partially aligned slots into which are received pins extending laterally outwardly from opposite sides of the mold portions. In an embodiment, the first longitudinal support has a first elongated slot, and the second longitudinal support has a second elongated slot. At least a portion of the first elongated slot faces and is aligned with at least a portion of the second elongated slot. The first and second elongated slots may each independently extend partially or all the way through the first and second longitudinal supports, provided that at least a portion of the first and second longitudinal slots are aligned and in facing opposition to each other. The first mold portion includes a first pin extending outward from a first side thereof and into the first elongated slot, and a second pin extending outward from a second side thereof and into the second elongated slot. Receipt of the first and second pins of the first mold portion within the first and second elongated slots of the first and second longitudinal supports, together provides a combination of: (i) reversible rotational attachment of the first mold portion to the first and second longitudinal supports; and (ii) reversible rotation of the first mold portion about its longitudinal axis; and (iii) reversible longitudinal positioning of the first mold portion towards the second mold portion.

The second mold portion further includes a first pin extending laterally outward from a first side thereof, and a second pin extending laterally outward from a second side thereof. The first pin of the second mold portion is rotationally attached to the first longitudinal support, e.g., by means of the first pin being received within an aligned recess or aperture within the first longitudinal support. The second pin of the second mold portion is rotationally attached to the second longitudinal support, e.g., by means of the first pin being received within an aligned recess or aperture within the second longitudinal support. Rotational attachment of, and, in particular, receipt of the first and second pins within aligned recesses or apertures of the first and second longitudinal supports provides a combination of: (i) reversible rotational attachment of the second mold portion to the first and second longitudinal supports; and (ii) reversible rotation of the second mold portion about the lateral axis thereof. As such, in this particular embodiment, while the first mold portion is longitudinally repositionable between the first and second longitudinal supports, the second mold portion is not longitudinally repositionable there-between, and is more particularly substantially longitudinally stationary.

With reference to FIGS. 1 and 2, first longitudinal support 171 of mold assembly 3 includes a first elongated slot 198, and second longitudinal support 174 includes a second longitudinal slot 201. As depicted in the drawings, substantially the whole of each of the first and second elongated slots (198, 201) are in facing opposition, and are substantially aligned with each other. In addition, the first and second elongated slots (198, 201) extend all the way through each of the first and second longitudinal supports.

First mold portion 11 includes: a first pin 204 that extends laterally outward from a first side 207 of the first mold portion; and a second pin 210 that extends laterally outward from a second side 213 of the first mold portion. Second side 213 of first mold portion 11 is not directly visible in the drawings. First pin 204 is received within first elongated slot 198 of first longitudinal support 171, and second pin 210 is received within second elongated slot 201 of second longitudinal support 174. Receipt of the first and second pins (204, 210) within the first and second elongated slots (198, 201) of the first and second longitudinal supports (171, 174) provides: (i) reversible rotational attachment of the first mold portion to the first and second longitudinal support; (ii) reversible rotation of the first mold portion about its lateral axis 180; and (iii) reversible longitudinal positioning of the first mold portion between the first and second longitudinal supports toward the second mold portion (e.g., along arrow 195 of FIG. 9).

With further reference to FIGS. 1 and 2, second mold portion 29 includes: a first pin 216 that extends laterally outward from a first side 219 of the second mold portion; and a second pin 222 that extends laterally outward from a second side 225 of the second mold portion. Second side 225 of second mold portion 29 is not directly visible in the drawings. First pin 216 is received within first aperture 228 of first longitudinal support 171, and second pin 222 is received within second aperture 231 of second longitudinal support 174. First aperture 228 is laterally spaced and separate from first elongated slot 198, and second aperture 231 is laterally spaced and separate from second elongated slot 201. Receipt of the first and second pins (216, 222) within the first and second apertures (228, 231) of the first and second longitudinal supports (171, 174) provides: (i) reversible rotational attachment of the second mold portion to the first and second longitudinal supports; (ii) reversible rotation of the second mold portion about its lateral axis 183; and (iii) substantially stationary longitudinal attachment of the second mold portion to the first and second longitudinal supports.

In an embodiment of the present invention, the first and second mold portions are each rotationally attached to, and longitudinally repositionable between, the first and second longitudinal supports. The first and second pins of the second mold portion may each be received within additional elongated slots (not shown) in the first and second longitudinal supports. In an embodiment, the first pin of the second mold portion is received within the first elongated slot of the first longitudinal support, and the second pin of the second mold portion is received within the second elongated slot of the second longitudinal support. Receipt of the first and second pins of the second mold portion into the first and second elongated slots additionally provides for reversible longitudinal positioning of the second mold portion, between the first and second longitudinal supports, and towards the first mold portion.

Figure 3:
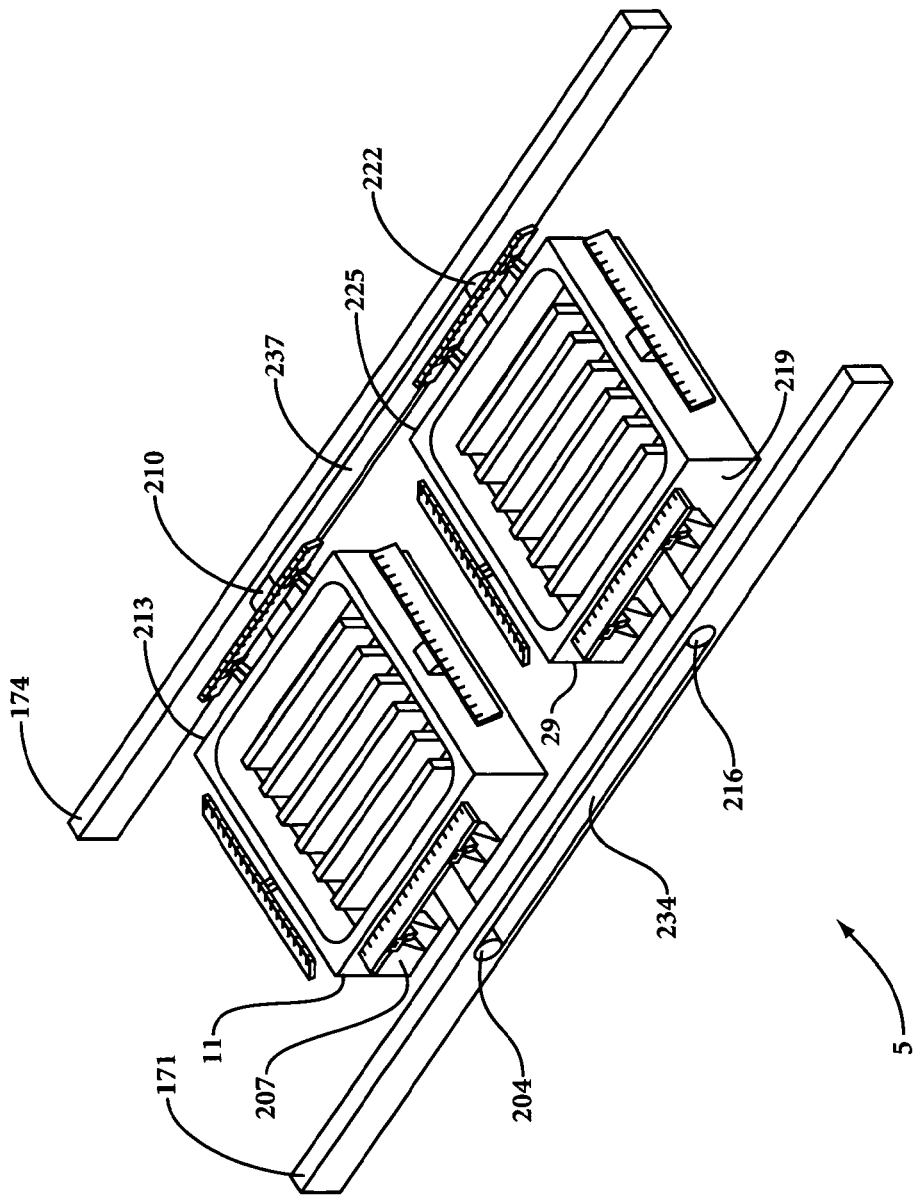
FIG. 3 is a representative perspective view of a mold assembly according to the present invention that is similar to that of FIG. 1, but in which both the first and second mold portions are reversibly laterally positionable within common elongated slots of the first and second longitudinal supports.

With reference to FIG. 3, first longitudinal support 171 of mold assembly 5 includes an elongated slot 234 into which are both received: first pin 204 of first mold portion 11; and first pin 216 of second mold portion 29. Second longitudinal support 174 of mold assembly 5 includes a second elongated slot 237 into which are both received: second pin 210 of first mold portion 11; and second pin 222 of second mold portion 29. The first and second elongated slots (234, 237) of mold assembly 5 are similar to but longer than the first and second elongated slots (198, 201) of mold assembly 3. As to the first and second mold portions, common receipt of their first pins within the same first elongated slot, and common receipt of their second pins within the same second elongated slot, provides both mold portions with: (i) reversible rotational attachment to the first and second longitudinal supports; (ii) reversible rotation about their respective lateral axes; and (iii) reversible longitudinal positioning between the first and second longitudinal supports and towards each other.

In an embodiment, the mold apparatus, and more particularly the mold assembly, of the present invention further includes: at least one first sheet retainer positioned outward relative to the perimeter edge of the first mold portion; and at least one second sheet retainer positioned outward relative to the perimeter edge of the second mold portion. The first and second sheet retainers may be attached to the sides of the respective first and second mold portions, or separate from the first and second mold portions, e.g., being attached to one or more separate platforms (not shown in the drawings). The first and second sheet retainers are positioned outward relative to the perimeter edges of the molds, so as: (i) to retain a portion (e.g., a third portion) of the respective first and second heated thermoplastic sheets therein; and (ii) not to contact the perimeter edge of the respective first and second mold portions they are associated with.

With reference to FIGS. 1 and 2, first mold portion 11 includes four first sheet retainers, 240(A), 240(B), 240(C) and 240(D), which are each attached to a separate outer sidewall of first mold portion 11. Each first sheet retainer 240, includes at least one hinge portion 243 that is attached to an outer sidewall of the first mold portion, and a clamp portion 246 that is attached to hinge portion 243. Each clamp portion 246 of each first sheet retainer 240 is reversibly positionable between open and closed positions. For purposes of illustration in FIGS. 1 and 2, each clamp portion 246 of first sheet retainers 240(B), 240(C) and 240(D) is shown in an open position, and clamp portion 246 of first sheet retainer 240(A) is shown in a closed position. When in an open position, the clamp portion 246 of a first sheet retainer 240 is positioned so as to receive a portion (e.g., third portion 99) of the heated first thermoplastic sheet (e.g., 75) therein. When in a closed position, the clamp portion 246 of a first sheet retainer 240 is positioned so as to retain a portion (e.g., third portion 99) of the heated first thermoplastic sheet within or beneath the clamp portion. The third portion of the heated first thermoplastic sheet may be retained between the clamp (e.g., 246) of the first sheet retainer (e.g., 240) and (i): an underlying plate (not shown in FIGS. 1-10); or (ii) the sidewall (e.g., first sidewall 207) of the first mold portion.

With further reference to FIGS. 1 and 2, second mold portion 29 includes four first sheet retainers, 249(A), 249(B), 249(C) and 249(D), which are each attached to a separate outer sidewall of second mold portion 29. Each second sheet retainer 249, includes at least one hinge portion 252 that is attached to an outer sidewall of the second mold portion, and a clamp portion 255 that is attached to hinge portion 252. Each clamp portion 255 of each second sheet retainer 249 is reversibly positionable between open and closed positions. For purposes of illustration in FIGS. 1 and 2, each clamp portion 255 of second sheet retainers 249(B), 249(C) and 249(D) is shown in an open position, and clamp portion 255 of second sheet retainer 249(A) is shown in a closed position. When in an open position, the clamp portion 255 of a second sheet retainer 249 is positioned so as to receive a portion (e.g., third portion 111) of the heated second thermoplastic sheet (e.g., 78) therein. When in a closed position, the clamp portion 255 of a second sheet retainer 249 is positioned so as to retain a portion (e.g., third portion 111) of the heated second thermoplastic sheet within or beneath the clamp portion. The third portion of the heated second thermoplastic sheet may be retained between the clamp (e.g., 255) of the second sheet retainer (e.g., 249) and (i): an underlying plate (not shown in FIGS. 1-10); or (ii) the sidewall (e.g., first sidewall 219) of the second mold portion.

With the first and second mold portions each provided with one or more first and second sheet retainers, as described above, the method of the present invention further includes retaining third portions of each of the heated first and second thermoplastic sheets with (e.g., within) the first and second sheet retainers, before reduced pressure is drawn through the plurality of interior mold surface perforations of the respective mold portion. Retaining a third portion of a heated thermoplastic sheet with (or within) a sheet retainer, maintains the first portion of the second surface of the heated thermoplastic sheet in contact (e.g., sealing contact) with the perimeter edge of the mold portion, and thus improves the efficiency with which the second portion of the second surface of the heated thermoplastic sheet is drawn by reduced pressure into contour matching contact with the interior surface of the mold portion.

More particularly, a third portion (e.g., 99, FIG. 13) of the heated first thermoplastic sheet (e.g., 75) is retained with/by at least one first sheet retainer (e.g., 240A, B, C and/or D), prior to drawing reduced pressure through the plurality of perforations (e.g., 20) of the interior mold surface (e.g., 14) of the first mold portion (e.g., 11). The third portion (e.g., 99) of the first thermoplastic sheet (e.g., 75) extends beyond the perimeter edge (e.g., 17) of the first mold portion (e.g., 11). Further particularly, a third portion (e.g., 111, FIG. 19) of the heated second thermoplastic sheet (e.g., 78) is retained with/by at least one second sheet retainer (e.g., 249A, B, C and/or D), prior to drawing reduced pressure through the plurality of perforations (e.g., 38) of the interior mold surface (e.g., 32) of the second mold portion (e.g., 29). The third portion (e.g., 111) of the heated second thermoplastic sheet (e.g., 78) extends beyond the perimeter edge (e.g., 35) of the second mold portion (e.g., 29).

The mold assembly of the mold apparatus of the present invention may further include: at least one first sheet retainer (e.g., 571, FIGS. 16-18) that is reversibly linearly positionable relative to the perimeter edge of the first mold portion, and at least one second sheet retainer (e.g., 571) that is reversibly linearly positionable relative to the perimeter edge of the second mold portion. Providing each mold portion with one or more independently, reversibly and linearly positionable sheet retainers provides control (e.g., localized control) over the thickness of the heated thermoplastic sheet that is drawn by reduced pressure into contour matching contact with the interior mold surface of the mold portion during the molding process, and, accordingly, control over the thickness of various portions of the final molded article.

For example, and in general, moving a sheet retainer (with a third portion of a heated thermoplastic sheet retained therein) linearly towards the perimeter edge of a mold portion provides more heated thermoplastic sheet in the area forward of the sheet retainer that is available to be drawn into contour matching contact with the interior mold surface. The resulting molded article typically has increased wall (e.g., sidewall) thickness in those areas where the sheet retainers are so moved towards the mold portion perimeter edge. Alternatively, moving a sheet retainer (with a third portion of a heated thermoplastic sheet retained therein) linearly away from the perimeter edge of a mold portion reduces the amount of heated thermoplastic sheet in the area forward of the sheet retainer that is available to be drawn into contour matching contact with the interior mold surface. The resulting molded article typically has decreased wall (e.g., sidewall) thickness in those areas where the sheet retainers are so moved away from the mold portion perimeter edge. As such, with some sheet retainers moving towards, and others concurrently moving away from the perimeter edge of the mold portion, the resulting molded article may be provided with variable thickness (e.g., sidewall thickness) in different areas thereof.

With the mold assembly of the mold apparatus of the present invention including independently linearly repositionable first and second sheet retainers, the method of the present invention further includes the following steps. Reversibly positioning at least one first sheet retainer independently toward and/or away from the perimeter edge (e.g., 17) of the first mold portion (e.g., 11), with the third portion (e.g., 99) of the heated first thermoplastic sheet (e.g., 75) retained by the first sheet retainer. Reversible positioning of each first sheet retainer is conducted independently at least one of, prior to and concurrently with, drawing reduced pressure through the plurality of perforations (e.g., 20) of the interior mold surface (e.g., 14) of the first mold portion (e.g., 11). In addition, at least one second sheet retainer is independently reversibly positioned toward and/or away from the perimeter edge (e.g., 35) of the second mold portion (e.g., 29), with the third portion (e.g., 111) of the heated second thermoplastic sheet (e.g., 78) retained by the second sheet retainer. Reversible positioning of each second sheet retainer is conducted independently at least one of, prior to and concurrently with, drawing reduced pressure through the plurality of perforations (e.g., 38) of the interior mold surface (e.g., 32) of the second mold portion (e.g., 29).

Figure 16:
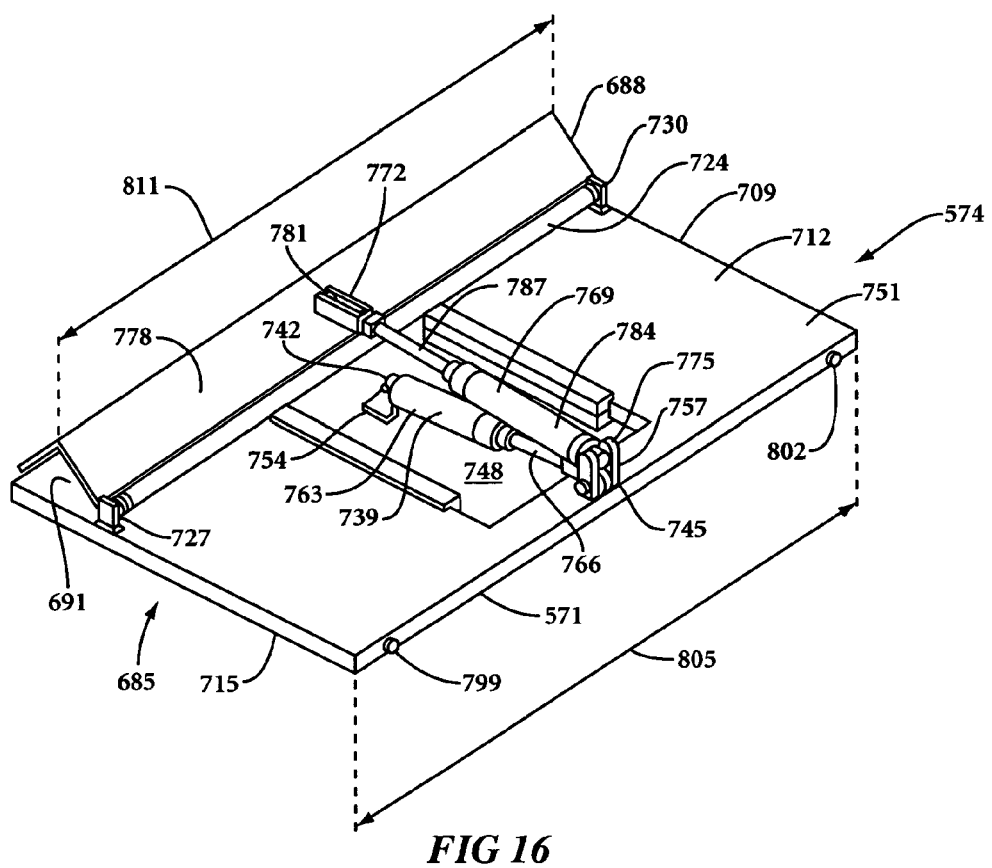
FIG. 16 is a representative perspective view towards the rear portion of a sheet retainer according to the present invention, that is reversibly linearly positionable relative to the perimeter edge of a mold portion with which it may be associated.
Figure 17:
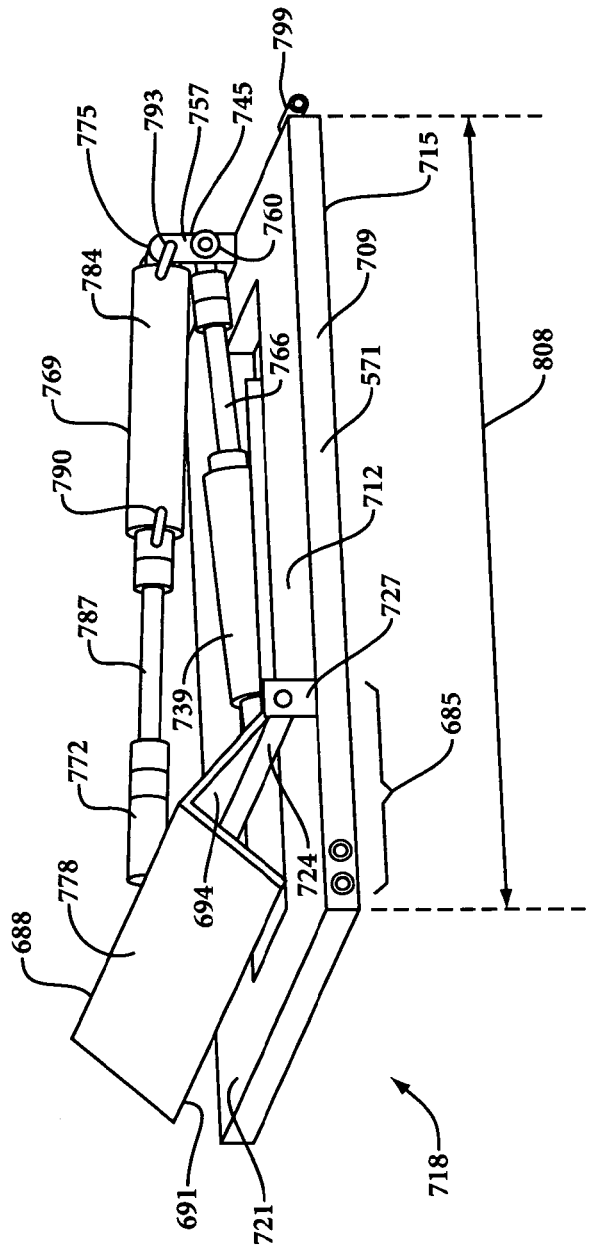
FIG. 17 is a representative perspective view towards the forward portion of the sheet retainer of FIG. 16.
Figure 18:
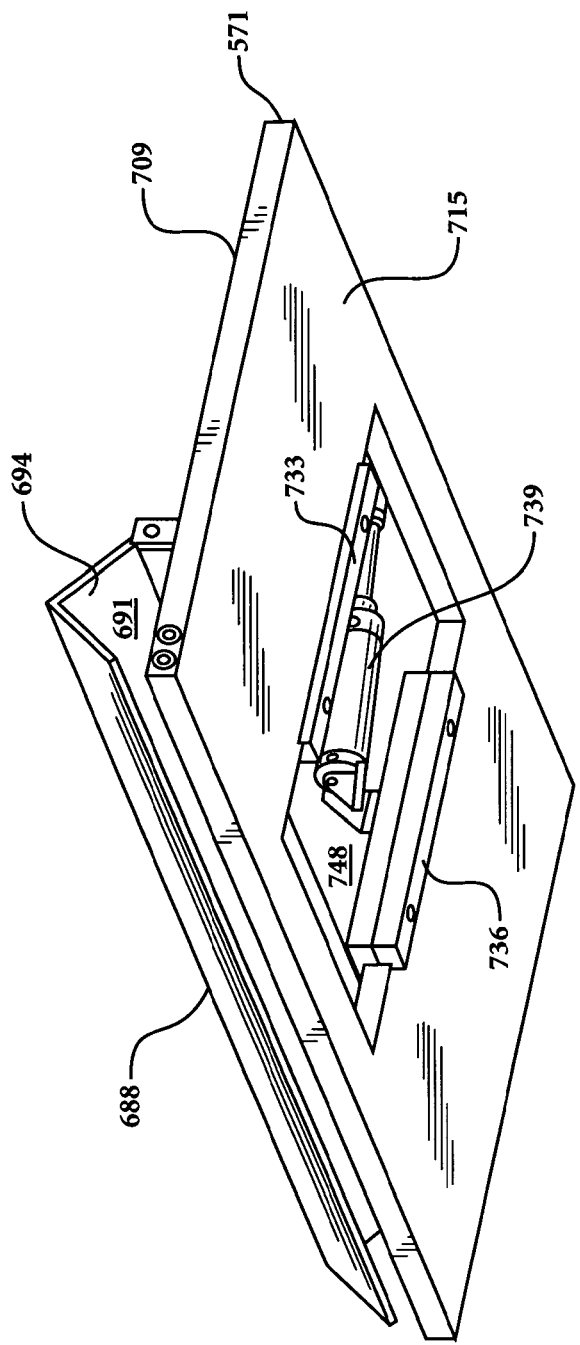
FIG. 18 is a representative perspective view towards the forward portion of the sheet retainer of FIG. 16 showing the underside of the sheet retainer.

For purposes of illustration, the first and/or second mold portions may each independently be provided with a reversibly linearly positionable sheet retainer 571, as depicted in and with reference to FIGS. 16 through 18. Each linearly repositionable sheet retainer 571 has a clamp portion 685 that faces towards (or in the direction of) the perimeter edge (17 or 35) of the mold portion (11, 29). Clamp portion 685 includes a clamp member 688 and a clamp interior 691. Clamp member 688 is reversibly closeable. Clamp interior 691 is defined in part by clamp member 688, and more particularly at least in part by interior (or under) surface 694 of clamp member 688. Clamp interior 691 may be defined by a combination of interior surface 694 of clamp member 688 and the upper surface of a forward portion of a base plate of sheet retainer 571 residing there-under, as will be discussed in further detail herein. Each sheet retainer 571 may be independently, reversibly and laterally attached to: an exterior sidewall of the mold portion; or the upper surface of a separate frame (not shown), such that clamp portion 685 is reversibly linearly positionable (e.g., laterally or vertically) relative to the perimeter edge (17, 35) of the mold portion (11, 29).

Sheet retainer 571 may further include a base plate 709 having an upper surface 712, a lower surface 715 and a forward portion 718. See, in particular, FIG. 17. Clamp member 688 is hingedly attached to an upper surface 712 of forward portion 718 of base plate 709. More particularly, clamp member 688 is attached to upper surface 712 by means of a hinge member 724 that engages hingedly (or rotationally) with hinge retainers 727 and 730, which are opposingly positioned on (relative to each other) and extend upwardly from upper surface 721 of forward portion 718. Clamp portion 685 of sheet retainer 571 is defined by clamp member 688 and forward portion 718 of base plate 709. The upper surface 721 of forward portion 718 of base plate 709 and inner surface 694 of clamp member 688 together define clamp interior 691.

At least a portion of lower surface 715 of base plate 709 is in sliding and abutting relationship with an exterior sidewall surface of a mold portion, or the upper surface of a separate horizontally positioned frame (not shown). In an embodiment, sheet retainer 571 further includes at least one elongated guide extending from lower surface 715 of base plate 709, which is received within a suitably dimensioned groove or slot (not shown) within the exterior sidewall surface of the mold portion, or the upper surface of a separate horizontally positioned frame. The elongated guides are typically oriented substantially orthogonal relative to (e.g., vertically along a mold portion sidewall, or laterally along the upper surface of a separate horizontally positioned frame) the perimeter edge (17, 35) of first and/or second mold portions (11, 29), and provide improved control (e.g., orientation) over the reversible lateral movement of the sheet retainers with the apparatus and in the method of the present invention. With reference to FIG. 18, sheet retainer 571 has a first elongated guide 733 and a second elongated guide 736 extending outward (downward) from lower surface 715 of base plate 709, which are slidingly received within suitably dimensioned grooves or slots (not shown) within, for example, an exterior sidewall surface (e.g., 207) of a mold portion. Sliding receipt of the elongated guides (733, 736) within the grooves in, for example, the exterior sidewall surface of the mold portion, serves to maintain sheet retainer 571 in a desired orientation (e.g., clamp portion 685 facing towards perimeter edge 17 of first mold portion 11) as it is reversibly linearly repositioned in the method of the present invention.

Reversible linear movement of each sheet retainer may be achieved manually, or more typically mechanically. Sheet retainer 571 further includes, in an embodiment and with reference to FIGS. 16 and 17, a first linear actuator 739 having a first end 742 and a second end 745. As used herein, the term "linear actuator" means a device that is reversibly linearly expandable. Linear actuators, as used with regard to the sheet retainer, may be selected from art-recognized devices, such as linear screw actuators, hydraulic linear actuators, pneumatic linear actuators and combinations thereof. Base plate 709 of sheet retainer 571 further includes a slot (or elongated hole/aperture) 748, and a rear portion 574 having an upper surface 751.

First end 742 of first linear actuator 739 is located within slot 748 and is fixedly attached to, for example, an exterior sidewall (e.g., 207) of the mold portion (e.g., first mold portion 11). First end 742 of first linear actuator 739 is typically pivotally attached to a bracket 754 that is attached to, for example, an exterior sidewall of the mold portion. Pivotal attachment between first end 742 and bracket 754 may be achieved by art-recognized means, such as a pin extending laterally through bracket 754 and a hole in first end 742. Second end 745 of first linear actuator 739 is fixedly attached to upper surface 751 of rear portion 574 of base plate 709. More typically, second end 745 of first linear actuator 739 is pivotally attached to a bracket 757 which extends upward from upper surface 751 of rear portion 574 of base plate 709. Pivotal attachment between second end 745 and bracket 757 may be achieved by art-recognized means, such as a pin 760 extending laterally through bracket 757 and a hole in second end 745.

First linear actuator 739, as depicted in the drawings, includes a cylinder 763 containing a piston (not visible) and a reversibly retractable arm 766 that is threadingly connected to second end 745. Reversible linear expansion of first linear actuator 739 provides reversible linear movement of sheet retainer 571 relative to the perimeter edge (17, 35) of the mold portion (11, 29). More particularly, as retractable arm 766 is extended, sheet retainer 571 (e.g., in place of one or more first and/or second sheet retainers 240, 249) is linearly and vertically (e.g., along the z-axis in FIG. 4) moved away from the perimeter edge (17, 35) of the mold portion (11, 17). Correspondingly, as retractable arm 766 is retracted within cylinder 763, sheet retainer 571 (e.g., in place of one or more first and/or second sheet retainers 240, 249) is linearly and vertically (e.g., along the z-axis in the FIG. 4) moved towards the perimeter edge (17, 35) of the mold portion (11, 29).

Clamp member 688 of sheet retainer 571 may be manually or, more typically, mechanically reversibly closed/opened. Sheet retainer 571 further includes, in an embodiment and with further reference to FIGS. 16 and 17, a second linear actuator 769 having a first end 772 and a second end 775. As with the first linear actuator 739, second linear actuator 769 is reversibly linearly expandable, and may be selected from known linear actuators, such as linear screw actuators, hydraulic linear actuators, pneumatic linear actuators and combinations thereof.

First end 772 of second linear actuator 769 is pivotally attached to the exterior surface 778 of clamp member 688. More typically, first end 772 of second linear actuator 769 is pivotally attached to a bracket or extension 781 that extends outwardly from exterior surface 778 of clamp member 688. As depicted in the drawings, first end 772 of second linear actuator 769 is in the form of a bracket, into which extension 781 is received, and pivotal attachment there-between may be achieved by art-recognized methods, such as a pin attached to first end 772 and extending through a hole in extension 781 (not visible in the drawing figures). Second end 775 of second linear actuator 769 is attached to upper surface 751 of rear portion 574 of base plate 709. Typically, second end 775 is pivotally attached to a bracket (e.g., bracket 757) that extends upwardly from upper surface 751 of rear portion 574 of base plate 709. Pivotal attachment between second end 775 and bracket 757 may be achieved by art-recognized methods, such as a pin extending through bracket 757 and second end 775.

In an embodiment, second end 745 of first linear actuator 739 and second end 775 of second linear actuator 769 are both attached to the same bracket (e.g., bracket 757). In this particular embodiment, and as depicted in the drawings, second end 775 of second linear actuator is pivotally attached to an upper portion of bracket 757, and second end 745 of first linear actuator 739 is attached to a lower portion of bracket 757, beneath the attachment point of second end 775.

Second linear actuator 769, as depicted in the drawings, includes a cylinder 784 containing a piston (not visible) and a reversibly retractable/extendable arm 787 that is threadingly connected to first end 772. Reversible linear expansion of second linear actuator 769 provides reversible closing (and correspondingly, opening) of clamp member 688. In particular, as reversibly retractable arm 787 is extended, clamp member 688 is moved to or towards a closed position, and correspondingly as reversibly retractable arm 787 is retracted (within cylinder 784) clamp member 688 is moved to or towards an open position.

In the case of hydraulic and/or pneumatically driven linear actuators, the linear actuators of the sheet retainer may be fitted with ports through which a fluid (e.g., air and/or a liquid, such as hydraulic fluid/oil) is introduced (typically, under elevated pressure) for purposes of linearly expanding and retracting the linear actuator. With reference to FIG. 16, and for purposes of illustration, second linear actuator 769 includes a first port 790 and a second port 793 through which a fluid (e.g., air and/or a liquid, such as oil) may be introduced, under elevated pressure, for purposes of linearly extending and retracting arm 787, and thereby reversibly closing and opening clamp member 688. First linear actuator 739 may be similarly fitted with such ports (not shown).

In the course of an embodiment of the method of the present invention, a third portion (99, 111) of the heated first/second thermoplastic sheet (75, 58), e.g., extruded thermoformable sheet, is contacted with and retained within the clamp interior 691 of the clamp portion 685 of the sheet retainer 571. Typically, the third portion of the heated thermoplastic sheet is contacted with upper surface 721 of forward portion 718 before and after clamp member 688 is clamped down and the heated sheet thus being retained within clamp interior 691. To prevent or minimize fouling of the clamp portion 685 of the sheet retainer 571 (e.g., by molten or nearly molten thermoplastic material being retained thereon), it may be desirable to provide temperature control (e.g., cooling) to at least the forward portion 718 of sheet retainer 571. In an embodiment, base plate 709 of sheet retainer 571 is provided with at least one enclosed passage (not visible) which extends into forward portion 718 of base plate 709. The enclosed channel may extend through base plate 709, or it may be in the form of a conduit (not shown) attached to the exterior surface (e.g., upper surface 712) of base plate 709.

The enclosed passage is dimensioned for the receipt and passage of a heat exchange fluid there-through. The heat exchange fluid may be selected from those known to the skilled artisan, such as water, glycols (e.g., alkylene glycols, such as ethylene glycol, propylene glycol and/or poly-alkylene glycols), alcohols (e.g., methanol, ethanol, n-propanol and/or iso-propanol), and mixtures thereof. For example, and with reference to FIG. 16, a heat exchange fluid may be drawn from the reservoir of a heat exchanger (not shown), introduced through port 799 and removed through port 802 (and returned to the reservoir of the heat exchanger). The heat exchange fluid is typically introduced into the enclosed passage (that is in fluid communication with ports 799 and 802) at a reduced temperature (e.g., a temperature less than that of the heated thermoplastic sheet, such as less than or equal to room temperature, 20° C., 15° C. or 10° C.). The heat exchange fluid passes through the enclosed passage into forward portion 718 (not depicted in the drawings) and serves to remove heat energy therefrom, as the heat exchange fluid is removed from port 802.

The sheet retainers, and the various components thereof, such as the base plate, clamp member and hinge member, may be fabricated from any suitable rigid material. For example, each sheet retainer may be fabricated from metals, thermoset plastic materials, thermoplastic materials, ceramic materials and combinations thereof. Typically, the sheet retainers are fabricated from metals (e.g., steel).

The stationary (e.g., 240, 249) and reversibly linearly positional (e.g., 571) sheet retainers may each independently have any suitable dimension, provided they are able to retain a portion (e.g., third portion) of the heated thermoplastic sheet within the clamp portion thereof. With reference to FIGS. 16 and 17, base plate 709 typically has a width 805 of from 7.62 cm to 127 cm, more typically from 15.24 cm to 101.6 cm, and further typically from 30.48 cm to 60.96 cm. In an embodiment, base plate 709 has a width 805 of 50.75 cm. Base plate 709 typically has a length 808 of from 7.62 cm to 127 cm, more typically from 15.24 cm to 101.6 cm, and further typically from 30.48 cm to 60.96 cm. In an embodiment, base plate 709 has a length 808 of 45.72 cm. Clamp member 688 typically has a width 811 of from 7.62 cm to 127 cm, more typically from 15.24 cm to 101.6 cm, and further typically from 30.48 cm to 60.96 cm. In an embodiment, clamp member 688 has a width 811 of 50.75 cm, which is substantially equivalent to the width 805 of base plate 709. Alternatively, the rear portion 574 and the forward portion 718 of base plate 709 may have different widths 805. For example, width 805 of rear portion 574 may be greater than (or less than) width 805 of forward portion 718.

The mold apparatus, in an embodiment of the present invention, includes a single die having, a first sheet slot portion, and a second sheet slot portion. The first and second sheet slot portions are laterally spaced from each other. The first and second sheet slot portions each serve to define each of the heated first and second thermoplastic sheets that are respectively formed by passage of the respective first/second thermoplastic composition there-through. The sheet die further includes, a plurality of first gates that are reversibly positionable across the first sheet slot portion, and a plurality of second gates that are reversibly positionable across the second sheet slot portion.

The plurality of first gates serve to define the width and thickness (or vertical opening/height) of the first sheet slot portion. As such, the plurality of first gates also serve to define the width and the thickness (across the width and/or along the length) of the heated first thermoplastic sheet that is formed by passage of the first thermoplastic composition there-through. The plurality of second gates serve to define the width and thickness (or vertical opening/height) of the second sheet slot portion. Correspondingly, the plurality of second gates also serve to define the width and the thickness (across the width and/or along the length) of the heated second thermoplastic sheet that is formed by passage of the second thermoplastic composition there-through.

With the sheet die so provided with first and second sheet slot portions, and an associated plurality of first and second gates, the method of the present invention further includes the following. The first thermoplastic composition is passed through the first sheet slot portion of the sheet die, and the plurality of first gates are adjusted across the first sheet slot portion, so as to control the width and vertical opening of the first sheet slot portion. Adjusting the first gates across the first sheet slot portion also serves to control: (a) the width of the heated first thermoplastic sheet; and (b) the thickness of the heated first thermoplastic sheet, (i) across the width of the heated first thermoplastic sheet, and/or (ii) along said length of the heated first thermoplastic sheet.

The first gates may be adjusted across the first sheet slot portion prior to and/or during passage of the first thermoplastic composition through the first sheet slot portion and formation of the first heated thermoplastic sheet. For example, the first gates may be adjusted across the first sheet slot portion prior to, but not after, passage of the first thermoplastic composition through the first sheet slot portion, in which case, the resulting heated first thermoplastic sheet has a substantially constant width, and substantially constant thickness across the width and along the length of the heated first thermoplastic sheet. Alternatively, the first gates may be adjusted (e.g., variably adjusted) across the first sheet slot portion during passage of the first thermoplastic composition through the first sheet slot portion, in which case, the resulting heated first thermoplastic sheet may have: a variable width; and/or a variable thickness across the width and/or along the length of the heated first thermoplastic sheet.

With the sheet die so provided with first and second sheet slot portions, and an associated plurality of first and second gates, the method of the present invention also involves, passing the second thermoplastic composition through the second sheet slot portion of the sheet die, and adjusting the plurality of second gates across the second sheet slot portion, so as to control the width and vertical opening of the second sheet slot portion. Adjusting the second gates across the second sheet slot portion also serves to control: (a) the width of the heated second thermoplastic sheet; and (b) the thickness of the heated second thermoplastic sheet, (i) across the width of said heated second thermoplastic sheet, and/or (ii) along the length of the heated second thermoplastic sheet.

As with the first gates, the second gates may be adjusted across the second sheet slot portion prior to and/or during passage of the second thermoplastic composition through the second sheet slot portion and formation of the second heated thermoplastic sheet. For example, the second gates may be adjusted across the second sheet slot portion prior to, but not after, passage of the second thermoplastic composition through the second sheet slot portion, in which case the resulting heated second thermoplastic sheet has a substantially constant width, and substantially constant thickness across the width and along the length of the heated second thermoplastic sheet. Alternatively, the second gates may be adjusted (e.g., variably adjusted) across the second sheet slot portion during passage of the second thermoplastic composition through the second sheet slot portion, in which case, the resulting heated second thermoplastic sheet may have: a variable width; and/or a variable thickness across the width and/or along the length of the heated second thermoplastic sheet.

Figure 15:
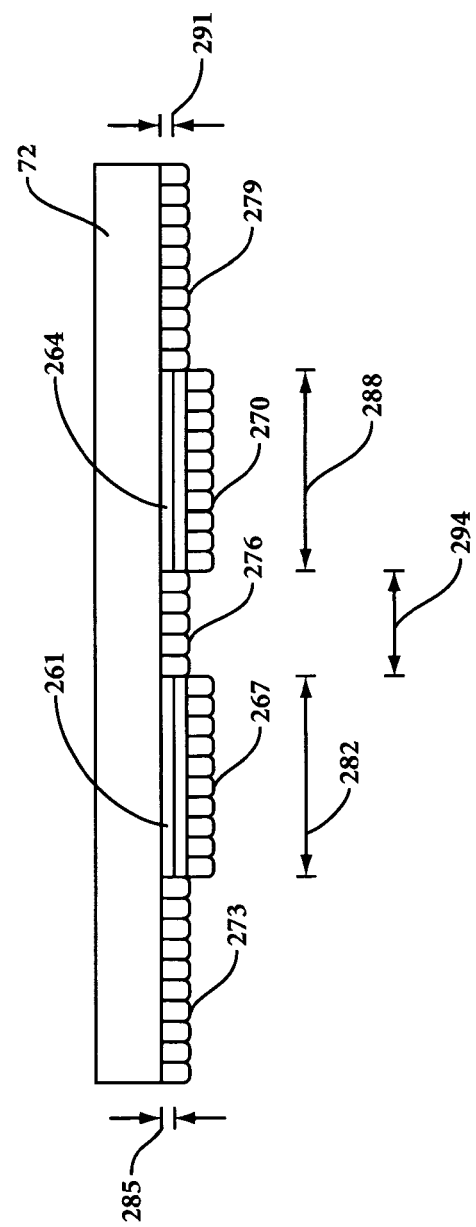
FIG. 15 is a representative elevational view of a sheet die of the method and apparatus of the present invention, that further includes a plurality of reversibly positionable gates that serve to define first and second sheet slot portions.

With reference to FIG. 15, sheet die 72 is depicted as further including a first sheet slot portion 261 and a second sheet slot portion 264, which are laterally spaced relative to each other. Sheet die 72 of FIG. 15 further includes a plurality of first gates 267 that are each independently reversibly positionable across first sheet slot portion 261, and a plurality of second gates 270 that are each independently reversibly positionable across second sheet slot portion 264. The first and second plurality of gates (267, 270) may each be reversibly positionable across the respective first and second sheet slot portions (261, 264) by manual or, more typically, mechanical means (e.g., by means of a plurality of art-recognized independently controllable linear actuators, not shown).

In an embodiment, the sheet die may include a sheet slot (e.g., a single long sheet slot), such as sheet slot 258 of FIG. 4, that, in addition to the first and second plurality of gates (267, 270), is divided by further plates and/or gates that extend across sheet slot 258, so as to define the first and second sheet slot portions (261, 264). For example, and as depicted in FIG. 15, sheet die 72 includes: a third plurality of gates 273; a fourth plurality of gates 276; and a fifth plurality of gates 279, that each extend fully across and substantially block and define closed portions of the underlying sheet slot 258. The third (273) and fifth (279) plurality of gates are positioned at terminal portions of sheet die 72 and sheet slot 258; the first plurality of gates 267 are interposed between the third (273) and fourth (276) plurality of gates; the fourth plurality of gates 276 are interposed between the first (267) and second (270) plurality of gates; and the second plurality of gates 270 are interposed between the fourth (276) and fifth (279) plurality of gates. The additional third (273), fourth (276) and fifth (279) plurality of gates may each be reversibly and independently positionable across the respective sheet slot 258 by manual or more typically mechanical means (e.g., by means of a plurality of art-recognized independently controllable linear actuators, not shown).

With the third (273), fourth (276) and fifth (279) plurality of gates extending across and blocking the underlying sheet slot 258; and with the first (267) and second (270) plurality of gates each being positioned so as not to block the underlying sheet slot 258, the first (261) and second (264) sheet slot portions are so defined. Alternatively, the sheet die may include separate first and second sheet slot portions (e.g., as may be cut into the sheet die), and which are defined by the first and second plurality of gates (e.g., 267, 270), in the absence of further gates, such as the third, fourth and fifth plurality of gates.

First sheet slot portion 261 has a width 282 and a vertical height (or vertical opening/thickness) 285. Second sheet slot portion 264 has a width 288 and a vertical height (or vertical opening/thickness) 291. First sheet slot portion 261 and second sheet slot portion 264 are laterally spaced from each other by a lateral distance 294. The lateral spacing and lateral distance 294 between the first (261) and second (264) sheet slot portions may be defined by the fourth plurality of gates 276 (if present).

Adjusting the first plurality of gates 267 across first sheet slot portion 261 serves to define both the width 282 and the vertical height 285 of the first sheet slot portion 261, and correspondingly the width and thickness (across the width and/or along the length) of the first heated thermoplastic sheet (e.g., 75) formed thereby/there-through. In an embodiment, the width 282 of first sheet slot portion 261 is defined by a combination of the third (273), first (267) and fourth (276) plurality of gates relative to (e.g., fully and less than fully across) the underlying sheet slot 258.

Adjusting the second plurality of gates 270 across second sheet slot portion 264 serves to define both the width 288 and the vertical height 291 of the second sheet slot portion 264, and, correspondingly, the width and thickness (across the width and/or along the length) of the second heated thermoplastic sheet (e.g., 78) formed thereby/there-through. In an embodiment, the width 288 of second sheet slot portion 264 is defined by a combination of the fourth (276), second (270) and fifth (279) plurality of gates relative to (e.g., fully and less than fully across) the underlying sheet slot 258.

As described previously herein, the first mold portion (e.g., 11), the second mold portion (e.g., 29), the first longitudinal support (e.g., 171) and the second longitudinal support (e.g., 174) together form a mold assembly (e.g., 3 or 5) of the mold apparatus (e.g., 1) of the present invention. In a particular embodiment, the mold assembly is reversibly moveable in a plane beneath the sheet die, while the sheet die is substantially stationary there-over. With the mold assembly and sheet die so positioned, the method of the present invention further includes, moving the mold assembly at variable linear velocity beneath the substantially stationary sheet die, as the first portion of the second surface of the heated first thermoplastic sheet is contacted with the perimeter edge of the first mold portion, and as the first portion of the second surface of the heated second thermoplastic sheet is contacted with the perimeter edge of the second mold portion.

Moving the mold assembly at variable linear velocity beneath the substantially stationary sheet die, provides control of: the thickness of the heated first thermoplastic sheet along its length (e.g., length 297, FIG. 5) over the first mold portion; and the thickness of the heated second thermoplastic sheet along its length (e.g., length 300, FIG. 5) over the second mold portion. For example, and with reference to FIG. 4, moving mold assembly 3 (supported on the plurality of vertically upstanding support members 123 on platform 120) at increased linear velocity in the plane (e.g., defined by the x- and y-axes) beneath sheet die 72, results in the heated first (75) and second (78) thermoplastic sheets having reduced thickness (e.g., due to thinning thereof) over the respective first (11) and second (29) mold portions, compared to moving the mold assembly at decreased (or lower) linear velocity beneath the sheet die.

The mold assembly may be moved at a variable or substantially constant linear velocity in the plane beneath the sheet die. The variable linear velocity, at which the mold assembly may be moved, may include: a plurality of separate sequential linear velocities (e.g., each having a selected duration, or equivalently being conducted over a selected distance), in which, each subsequent linear velocity is less than or greater than the immediately preceding linear velocity; steadily increasing linear velocities; steadily decreasing velocities; or any combination thereof.

The mold apparatus, in an embodiment of the present invention, further includes: a first extruder having a terminal end that is in fluid communication with the first sheet slot portion of the sheet die; and a second extruder having a terminal end that is in fluid communication with the second sheet slot portion of the sheet die. With the mold apparatus so augmented, the method of the present invention further includes, melting (e.g., melt mixing and/or melt compounding) the first thermoplastic composition in the first extruder, thereby forming a first molten thermoplastic composition, and then passing the first molten thermoplastic composition through the first sheet slot portion of the sheet die, so as to form the heated first thermoplastic sheet. The method further includes, melting (e.g., melt mixing and/or melt compounding) the second thermoplastic composition in the second extruder, thereby forming a second molten thermoplastic composition, and then passing the second molten thermoplastic composition through the second sheet slot portion of the sheet die, thereby forming the heated second thermoplastic sheet.

The first and second molten thermoplastic compositions may be formed in the first and second extruders sequentially or more typically substantially concurrently. In addition, the first and second molten thermoplastic compositions may be passed through the first and second sheet slot portions sequentially or, more typically, substantially concurrently.

The first and second thermoplastic compositions that are melted in the first and second extruders, may be the same or different. Correspondingly, the first and second molten thermoplastic compositions may be the same or different. In an embodiment, the mold apparatus includes a single extruder having a terminal end that is in fluid communication with both of the first sheet slot portion and the second sheet slot portion of the sheet die. With the single extruder embodiment, the first and second thermoplastic compositions are the same, since typically a single thermoplastic composition is introduced into and melted within the single extruder, thereby forming a single molten thermoplastic composition, which is then passed through both of the first and second sheet slot portions, so as to form the heated first and second thermoplastic sheets.

With reference to FIG. 4, and for purposes of illustration, mold apparatus 1 further includes a first extruder 303 and a second extruder 306. First extruder 303 includes a feed end 309 having a feed port 312, a terminal (or extrudate) end 315, and a barrel 318 positioned and extending between feed end 309 and terminal end 315. Second extruder 306 similarly includes a feed end 321 having a feed port 324, a terminal (or extrudate) end 327, and a barrel 330 positioned and extending between feed end 321 and terminal end 327.

The first and second extruders (303, 306) may be independently selected from single screw, or counter- or co-rotating twin screw extruders that are known to the skilled artisan. The first and second extruders each typically include one or more heated zones along the length of its barrel (318, 330), the temperature(s) of which are controllable. The first and second thermoplastic compositions, which each typically comprise at least one thermoplastic polymer and optionally one or more additives (e.g., glass fibers and/or antioxidants), are each introduced into the feed port (312, 324) of the first (303) and second (306) extruders, is melted and compounded as it moves through the barrel thereof (318, 330), and emerges from the terminal end thereof (315, 327) as the first or second molten thermoplastic composition, as the case may be.

Terminal end 315 of first extruder 303 is in fluid communication with sheet die 72, typically by means of a conduit 333, which may be optionally heated. Terminal end 327 of second extruder 306 is in fluid communication with sheet die 72, typically by means of a conduit 336, which may be optionally heated. The first molten thermoplastic composition is forwarded from terminal end 315 of first extruder 303, through conduit 333, and into sheet die 72; and the second molten thermoplastic composition is forwarded from terminal end 327 of second extruder 306, through conduit 336, and into sheet die 72. Sheet die 72 typically includes a first interior channel (not shown) that is in fluid communication with both conduit 333 and the first sheet slot portion (e.g., 261 of FIG. 15). Sheet die 72 further typically includes a second interior channel (not shown) that is in fluid communication with both conduit 336 and the second sheet slot portion (e.g., 264 of FIG. 15). The first molten thermoplastic composition is passed from conduit 333 of first extruder 303 into the first interior channel of sheet die 72, and then through the first sheet slot portion (e.g., 261, FIG. 15) so as to form (typically, continuously) heated first thermoplastic sheet 75. Similarly, the second molten thermoplastic composition is passed from conduit 336 of second extruder 306 into the second interior channel of sheet die 72, and then through the second sheet slot portion (e.g., 264, FIG. 15) so as to form (typically, continuously) heated second thermoplastic sheet 78. Sheet die 274 may optionally be separately heated, so as to maintain the first and second molten thermoplastic compositions, that pass there-through, in a molten state.

In an embodiment of the method of the present invention, the first portion of the second surface of the heated first thermoplastic sheet is contacted with the perimeter edge of the first mold portion prior to necking of the heated first thermoplastic sheet after it emerges from the first sheet slot portion of the sheet die. In addition, the method also includes contacting the first portion of the second surface of the heated second thermoplastic sheet with the perimeter edge of the second mold portion prior to necking of the heated second thermoplastic sheet after it emerges from the second sheet slot portion of the sheet die.

Figure 14:
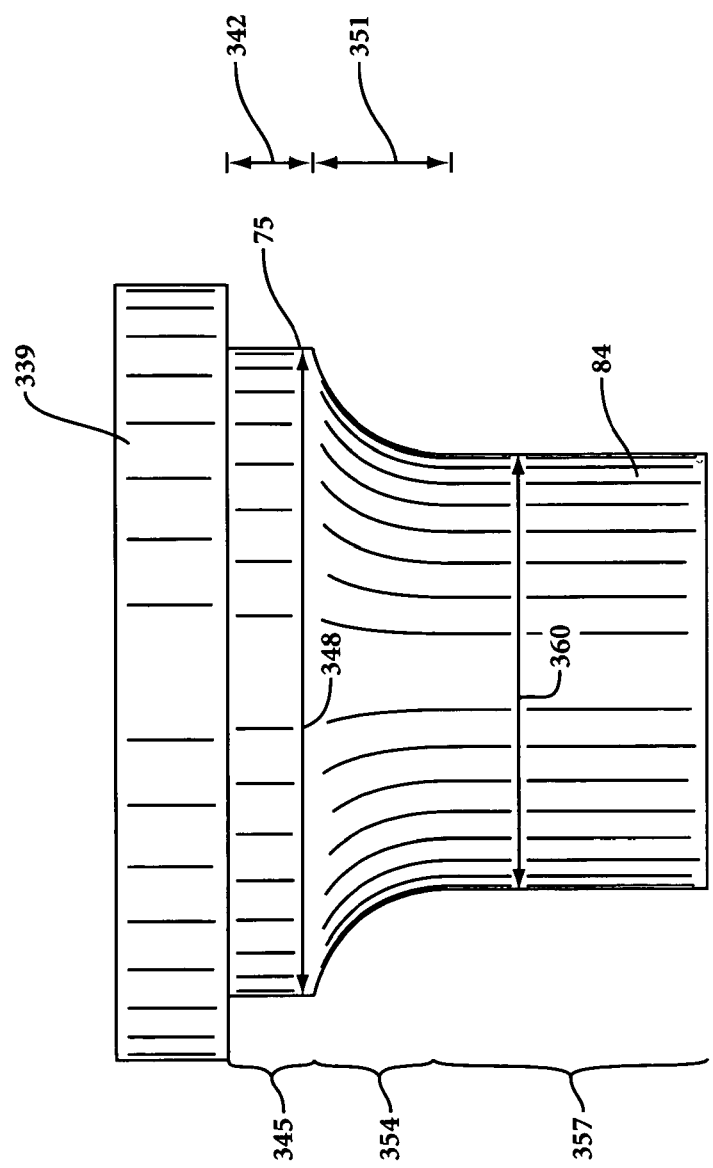
FIG. 14 is a representative elevational view of the second surface of a heated first thermoplastic sheet as it emerges from a sheet die, in which the heated first thermoplastic sheet exhibits the phenomenon of necking.

As each heated thermoplastic sheet drops vertically and gravitationally from the sheet die, each sheet may be subject to necking, which causes the width of the heated thermoplastic sheet to decrease. For purposes of illustration, and with reference to FIG. 14, heated first thermoplastic sheet 75 is depicted as exhibiting the phenomenon of necking. In FIG. 14, heated first thermoplastic sheet 75 is depicted as emerging from a first sheet slot (not visible) located on the underside of a sheet die 339. As heated first thermoplastic sheet 75 drops through first vertical distance 342, a pre-necked portion 345 having an initial width 348 is formed. After heated thermoplastic sheet 75 drops further through second vertical distance 351, the phenomenon of necking occurs and a transition portion 354 is formed having a variably decreasing width. After falling through second vertical distance 351, the necking phenomenon is complete, and a necked portion 357 having a stabilized width of 360 is formed. Width 360 of necked portion 357 is smaller (of lesser magnitude) than width 348 of initial portion 345 of heated first thermoplastic sheet 75.

The phenomenon of sheet necking may have numerous causes, including but not limited to, the molten thermoplastic composition, the configuration of the sheet die (e.g., the shape of the sheet slot portions), the temperature of the heated thermoplastic sheet as it emerges from the sheet slot portion, and combinations thereof. The phenomenon of necking is typically undesirable, since the resulting reduction in the width of the heated thermoplastic sheet usually necessitates the use of a wider, heavier and more expensive sheet die.

In an embodiment of the method of the present invention, the step of contacting the first portion of the second surface of the first and second heated thermoplastic sheets (75, 78) with the perimeter edge (17, 35) of the respective mold portion (11, 29) occurs prior to necking of the heated thermoplastic sheets. Contacting the first and second heated thermoplastic sheets with the perimeter edge of the respective mold portion prior to necking, substantially prevents necking of the heated thermoplastic sheets. With further reference to FIG. 14, for example, when the first portion (e.g., 93, FIG. 13) of the second surface 84 of first heated thermoplastic sheet 75 is contacted with perimeter edge 17 of first mold portion 11 within vertical distance 342 (i.e., before necking occurs), necking of the heated first thermoplastic sheet is substantially prevented, and the heated thermoplastic sheet retains its initial (non-necked) width 348.

As discussed previously with regard to the molding apparatus, in an embodiment of the present invention, the mold assembly (which includes the first and second mold portions, and the first and second longitudinal supports) is positioned and moveable in a plane (e.g., the plane defined by the x- and y-axes of FIG. 4) beneath the sheet die, and the sheet die is substantially stationary. In addition to being reversibly moveable within a plane beneath the sheet die, the mold assembly (e.g., 3) may also be reversibly moveable along the z-axis, beneath the sheet die, thereby allowing for contact of the first portion of the second surface of each heated thermoplastic sheet with the perimeter edge of the respective mold portion prior to necking of the heated thermoplastic sheets.

With further reference to FIG. 4, mold assembly 3 is supported on linearly repositionable platform 120, by means of a plurality of vertically upstanding support members 123. Vertical support members 123 may, in an embodiment, each be a piston having a piston arm 363 that is vertically repositionable along the z-axis and attached to longitudinal supports (171, 174) of mold assembly 3. As depicted in FIG. 4, each vertical support member/piston 123 includes a base (or piston chamber) 366 having a base portion resting on or connected to an upper surface 369 of platform 120, and an upper portion from which piston arm 363 extends. Each piston arm 363 has an upper portion that is connected to the longitudinal support (171 or 174) beneath which it resides. Typically, and as depicted in FIG. 4, each longitudinal support has two longitudinally spaced vertical support members/pistons 123 attached thereto. In FIG. 4, only one of the two vertical support members/pistons 123 is visible with regard to second longitudinal support 174.

In an embodiment of the present invention and with reference to FIG. 4, platform 120, with mold assembly 3 supported thereon by the plurality of vertical support members/pistons 123, is moved linearly beneath stationary sheet die 72, in the direction represented by arrow head 126 of double headed arrow 117. As mold assembly 3 is so moved linearly beneath sheet die 72, the piston arm 363 of each vertical support member/piston 123 is vertically adjusted along the z-axis (e.g., downwardly, but more typically upwardly) so as to position mold assembly 3 and, in particular, the perimeter edges (17, 35) of the first and second mold portions (11, 29) within a pre-necking distance (e.g., first vertical distance 342 of FIG. 14) relative to sheet die 72, and more particularly, the first and second sheet slot portions thereof. With mold assembly 3 and, in particular, the perimeter edges (17, 35) of the first and second mold portions (11, 29) so positioned within the pre-necking vertical distance, contact of the first portion of the second surface of the heated first and second thermoplastic sheets with the perimeter edges of the first and second mold portions, in each case, occurs prior to necking of the first and second heated thermoplastic sheets.

In the method of the present invention, the heated first and second thermoplastic sheets are each independently formed (e.g., by melt compounding/extrusion) from respective first and second thermoplastic compositions. The first and second thermoplastic compositions each independently include at least one thermoplastic material. As used herein and in the claims, the term "thermoplastic material" and similar terms, means a plastic material that has a softening and melting point, and is substantially free of a three dimensional crosslinked network resulting from the formation of covalent bonds between chemically reactive groups (e.g., active hydrogen groups and free isocyanate groups).

Examples of thermoplastic materials that may be included in the first and/or second thermoplastic compositions include, but are not limited to, thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyolefins, thermoplastic (meth)acrylates, thermoplastic acrylonitrile-butadiene-styrene, thermoplastic styrene-acrylonitrile, thermoplastic acrylonitrile-stryrene-acrylate and combinations thereof (e.g., blends and/or alloys of at least two thereof).

In a particular embodiment, the first and second thermoplastic compositions each include a thermoplastic material selected independently from one or more polyolefins, such as polyethylene and/or polypropylene.

As used herein and in the claims, the term "polyolefin" and similar terms, such as "polyalkylene" and "thermoplastic polyolefin," means polyolefin homopolymers, polyolefin copolymers, homogeneous polyolefins and/or heterogeneous polyolefins. For purposes of illustration, examples of a polyolefin copolymers include those prepared from ethylene and one or more $C_3$-$C_{12}$ alpha-olefin, such as 1-butene, 1-hexene and/or 1-octene.

The polyolefins, from which the thermoplastic material of the first and second thermoplastic compositions, may in each case be independently selected include, but are not limited to, heterogeneous polyolefins, homogeneous polyolefins, and combinations thereof. The term "heterogeneous polyolefin" and similar terms means polyolefins having a relatively wide variation in: (i) molecular weight amongst individual polymer chains (i.e., a polydispersity index of greater than or equal to 3); and (ii) monomer residue distribution (in the case of copolymers) amongst individual polymer chains. The term "polydispersity index" (PDI) means the ratio of $M_w/M_n$, where $M_w$ means weight average molecular weight, and $M_n$ means number average molecular weight, each being determined by means of gel permeation chromatography (GPC) using appropriate standards, such as polyethylene standards. Heterogeneous polyolefins are typically prepared by means of Ziegler-Natta type catalysis in heterogeneous phase.

The term "homogeneous polyolefin" and similar terms means polyolefins having a relatively narrow variation in: (i) molecular weight amongst individual polymer chains (i.e., a polydispersity index of less than 3); and (ii) monomer residue distribution (in the case of copolymers) amongst individual polymer chains. As such, in contrast to heterogeneous polyolefins, homogeneous polyolefins have similar chain lengths amongst individual polymer chains, a relatively even distribution of monomer residues along polymer chain backbones, and a relatively similar distribution of monomer residues amongst individual polymer chain backbones. Homogeneous polyolefins are typically prepared by means of single-site, metallocene or constrained-geometry catalysis. The monomer residue distribution of homogeneous polyolefin copolymers may be characterized by composition distribution breadth index (CDBI) values, which are defined as the weight percent of polymer molecules having a comonomer residue content within 50 percent of the median total molar comonomer content. As such, a polyolefin homopolymer has a CDBI value of 100 percent. For example, homogenous polyethylene/alpha-olefin copolymers typically have CDBI values of greater than 60 percent or greater than 70 percent. Composition distribution breadth index values may be determined by art recognized methods, for example, temperature rising elution fractionation (TREF), as described by Wild et al, Journal of Polymer Science, Poly. Phys. Ed., Vol. 20, p. 441 (1982), or in U.S. Pat. No. 4,798,081, or in U.S. Pat. No. 5,089,321. An example of homogeneous ethylene/alpha-olefin copolymers are SURPASS polyethylenes, commercially available from NOVA Chemicals Inc.

The thermoplastic material of each thermoplastic composition (e.g., the first and/or second thermoplastic compositions) may in each case independently and optionally include a reinforcing material selected, for example, from glass fibers, glass beads, carbon fibers, metal flakes, metal fibers, polyamide fibers (e.g., KEVLAR polyamide fibers), cellulosic fibers, nanoparticulate clays, talc and mixtures thereof. If present, the reinforcing material is typically present in a reinforcing amount, e.g., in an amount of from 5 percent by weight to 60 or 70 percent by weight, based on the total weight of the thermoplastic material. The reinforcing fibers, and the glass fibers in particular, may have sizings on their surfaces to improve miscibility and/or adhesion to the thermoplastic materials into which they are incorporated, as is known to the skilled artisan.

In an embodiment of the invention, the reinforcing material is in the form of fibers (e.g., glass fibers, carbon fibers, metal fibers, polyamide fibers, cellulosic fibers and combinations of two or more thereof). The fibers typically have lengths (e.g., average lengths) of from 0.5 inches to 4 inches (1.27 cm to 10.16 cm). The heated first and second thermoplastic sheets (and, accordingly, the first and second profiled thermoplastic sheets) may each independently include fibers having lengths that are at least 50 or 85 percent of the lengths of the fibers that are present in the feed materials (e.g., the first and second thermoplastic compositions) from which the heated thermoplastic sheets are prepared, such as from 0.25 inches to 2 or 4 inches (0.64 cm to 5.08 or 10.16 cm). The average length of fibers present in the heated first and/or second thermoplastic sheets may be determined in accordance with art recognized methods. For example, the first and/or second heated thermoplastic sheets, and more typically the first and/or second profiled thermoplastic sheets, may be pyrolyzed to remove the thermoplastic material, and the remaining or residual fibers microscopically analyzed to determine their average lengths, as is known to the skilled artisan.

Fibers are typically present in the first and/or second thermoplastic compositions (and, correspondingly, the heated first and/or second thermoplastic sheets, and first and/or second profiled thermoplastic sheets) in amounts selected independently from 5 to 70 percent by weight, 10 to 60 percent by weight, or 30 to 50 percent by weight (e.g., 40 percent by weight), based on the total weight of the thermoplastic composition (i.e., the weight of the thermoplastic material, the fiber and any additives). Accordingly, the molded articles prepared by the method of the present invention may include fibers in amounts of from 5 to 70 percent by weight, 10 to 60 percent by weight, or 30 to 50 percent by weight (e.g., 40 percent by weight), based on the total weight of the molded article.

The fibers may have a wide range of diameters. Typically, the fibers have diameters of from 1 to 20 micrometers, or more typically from 1 to 9 micrometers. Generally, each fiber comprises a bundle of individual filaments (or monofilaments). Typically, each fiber is composed of a bundle of 10,000 to 20,000 individual filaments.

Typically, the fibers are uniformly distributed throughout the thermoplastic material of the heated first and/or second thermoplastic sheets and, correspondingly, the first and/or second profiled thermoplastic sheets. During mixing of the fibers and the thermoplastic material, the fibers generally form bundles of fibers typically comprising at least 5 fibers per fiber bundle, and preferably less than 10 fibers per fiber bundle. While not intending to be bound by theory, it is believed, based on the evidence at hand, that fiber bundles containing 10 or more fibers may result in a molded article having undesirably reduced structural integrity. The level of fiber bundles containing 10 or more fibers per bundle, may be quantified by determining the Degree of Combing present within a molded article. The number of fiber bundles containing 10 or more fibers per bundle is typically determined by microscopic evaluation of a cross section of the molded article, relative to the total number of microscopically observable fibers (which is typically at least 1000). The Degree of Combing is calculated using the following equation: 100× ((number of bundles containing 10 or more fibers)/(total number of observed fibers)). Generally, the heated first and/or second thermoplastic sheets, correspondingly, the first and/or second profiled thermoplastic sheets, and, further correspondingly, at least a portion of the molded article, each have a Degree of Combing of less than or equal to 60 percent, and typically less than or equal to 35 percent.

In addition or alternatively to reinforcing material(s), the first and second thermoplastic composition, from which the heated first and second thermoplastic sheets are each prepared, may optionally and independently include one or more additives. Additives that may be present in the first and/or second thermoplastic compositions include, but are not limited to, antioxidants, colorants, e.g., pigments and/or dyes, mold release agents, fillers, e.g., calcium carbonate, ultraviolet light absorbers, fire retardants and mixtures thereof. Additives may be present in the first and/or second thermoplastic compositions in functionally sufficient amounts, e.g., in amounts independently from 0.1 percent by weight to 10 percent by weight, based on the total weight of the thermoplastic composition.

In the method of the present invention, at least one of the heated first and second thermoplastic sheets may be longitudinally and/or transversely stretched by lateral movement of the sheet retainers away from the perimeter edge of the respective mold portion, while the heated thermoplastic sheet is between its glass transition temperature and below its melting temperature. During the stretching operations (e.g., $T_g < T_{(sheet)} < T_m$), the polymer molecules of the heated thermoplastic sheet, in the solid state, may become orientated in the stretching direction, thereby resulting in improved or increased physical properties (e.g., compressive strength) along the stretching direction. As such, at least a portion of the molded article formed in accordance with the method of the present invention may exhibit uniaxial or biaxial orientation (relative to the polymer molecules). In addition, when the first and/or second thermoplastic compositions includes fibers, such as glass fibers, stretching of the related heated thermoplastic sheet (e.g., under conditions of $T_g < T_{(sheet)} < T_m$), by lateral movement of the sheet retainers away from the mold perimeter edge, may also serve to orient the fibers uniaxilly or biaxially, thereby providing at least a portion of the molded article with improved or increased physical properties along the stretching direction.

Molded articles that may be prepared in accordance with the method of, and the mold apparatus of, the present invention may have complex 3-dimensional shapes, or relatively simple or non-complex shapes, such as panels (e.g., wall panels). Classes and/or types of molded articles that may be prepared according to the method of and with the mold apparatus of the present invention, include but are not limited to: support structures or platforms (e.g., pallets, shelving structures, walkway structures, cat walk structures, and marine dock structures); storage structures (e.g., storage lockers, and dunnage containers); architectural panels (e.g., wall and/or floor panels); transportation vehicle components (e.g., trailer sidewall and/or floor panels, running boards, and deck panels for boats or ships); and fluid management structures (e.g., storm drains and culverts).

The present invention has been described with reference to specific details of particular embodiments thereof. It is not intended that such details be regarded as limitations upon the scope of the invention except insofar as and to the extent that they are included in the accompanying claims.

What is claimed is:

1. A method of preparing a molded article comprising the steps of:
    a. providing a mold apparatus comprising:
        i. a first mold portion (11) having an interior mold surface (14), and perimeter edge (17), said interior mold surface of said first mold portion having a contour and a plurality of perforations (20); and
        ii. a second mold portion (29) having an interior mold surface (32), and a perimeter edge (35), said interior mold surface of said second mold portion having a contour and a plurality of perforations (38);
        iii. a first longitudinal support (171) and a second longitudinal support (174), said first longitudinal support and said second longitudinal support being laterally spaced relative to each other; said first longitudinal support (171) has a first elongated slot (198), said second longitudinal support (174) has a second elongated slot (201), at least a portion of said first elongated slot facing and being aligned with at least a portion of said second elongated slot;
        iv. said first mold portion (11) and said second mold portion (29) each residing between said first longitudinal support and said second longitudinal support;
        v. said first mold portion comprising a first pin (204) extending outward from a first side (207) of said first mold portion and into said first elongated slot, and a second pin (210) extending outward from a second side (213) of said first mold portion and into said second elongated slot, said first pin and said second pin of said first mold portion together providing:
            1. reversible rotational attachment of said first mold portion to said first longitudinal support and to said second longitudinal support;
            2. reversible rotation of said first mold portion about said lateral axis of said first mold portion; and
            3. reversible longitudinal positioning of said first mold portion towards said second mold portion;
        vi. said second mold portion comprising a first pin extending outward from a first side of said second mold portion and being rotationally attached to said first longitudinal support, and a second pin extending outward from a second side of said second mold portion and being rotationally attached to said second longitudinal support, said first pin and said second pin of said second mold portion together providing:
            1. reversible rotational attachment of said second mold portion to said first longitudinal support and to said second longitudinal support; and
            2. reversible rotation of said second mold portion about said lateral axis of said second mold portion;
        vii. said first mold portion being rotationally attached to said first longitudinal support and said second longitudinal support, thereby allowing said first mold portion to be reversibly rotatable about a lateral axis of said first mold portion between said first longitudinal support and said second longitudinal support;
        viii. said second mold portion being rotationally attached to said first longitudinal support and said second longitudinal support, thereby allowing said second mold portion to be reversibly rotatable about a lateral axis of said second mold portion between said first longitudinal support and said second longitudinal support; and
        ix. said first mold portion and said second mold portion being reversibly positionable so as to reversibly position said interior mold surface of said first mold portion and said interior mold surface of said second mold surface in facing opposition;
    b. forming, from a first thermoplastic composition, a heated first thermoplastic sheet (75) having a temperature that renders said heated first thermoplastic sheet thermoformable, said heated first thermoplastic sheet having a first surface and a second surface, forming, from a second thermoplastic composition, a heated second thermoplastic sheet (78) having a temperature that renders said heated second thermoplastic sheet thermoformable, said heated second thermoplastic sheet having a first surface and a second surface;
    c. contacting a first portion of said second surface of said heated first thermoplastic sheet with said perimeter edge of said first mold portion, contacting a first portion of said second surface of said heated second thermoplastic sheet with said perimeter edge of said second mold portion;

d. drawing reduced pressure through said plurality of perforations of said interior mold surface of said first mold portion, such that a second portion of said second surface of said first heated thermoplastic sheet substantially matches said contour of said interior mold surface of said first mold portion, thereby forming a first profiled thermoplastic sheet (129) having a second surface in contact with said interior mold surface of said first mold portion and a first surface that is substantially opposed to said second surface of said first profiled thermoplastic sheet, drawing reduced pressure through said plurality of perforations of said interior mold surface of said second mold portion, such that a second portion of said second surface of said second heated thermoplastic sheet substantially matches said contour of said interior mold surface of said second mold portion, thereby forming a second profiled thermoplastic sheet (144) having a second surface in contact with said interior mold surface of said second mold portion and a first surface that is substantially opposed to said second surface of said second profiled thermoplastic sheet;
  i. said method further comprising, rotating reversibly said first mold portion about said lateral axis of said first mold portion after forming said first profiled thermoplastic sheet, and rotating reversibly said second mold portion about said lateral axis of said second mold portion after forming said second profiled thermoplastic sheet, thereby placing said first surface of said first profiled thermoplastic sheet and said first surface of said second profiled thermoplastic sheet in facing opposition relative to each other; and
e. positioning said first mold portion and said second mold portion towards each other thereby:
  i. placing in facing opposition, and free of contact, a facing portion of said first surface of said first profiled thermoplastic sheet and a facing portion of said first surface of said second profiled thermoplastic sheet; and
  ii. contacting a contact portion (159) of said first surface of said first profiled thermoplastic sheet and a contact portion (163) of said first surface of said second profiled thermoplastic sheet;
f. fusing together said contact portion of said first surface of said first profiled thermoplastic sheet and said contact portion of said first surface of said second profiled thermoplastic sheet, by means of residual heat of sheet formation residing in each of said first profiled thermoplastic sheet and said second profiled thermoplastic sheet, thereby forming a fused and profiled multisheet article; and
g. cooling said fused and profiled multisheet article thereby forming said molded article;
h. wherein said facing portion of said first surface of said first thermoplastic profiled sheet and said facing portion of said first surface of said second thermoplastic profiled sheet together define an interior space of said molded article.

2. The method of claim 1 wherein:
a. said first pin of said second mold portion extends into said first elongated slot, and said second pin of said second mold portion extends into said second elongated slot;
b. said first pin and said second pin of said second mold portion together further providing, reversible longitudinal positioning of said second mold portion towards said first mold portion.

3. The method of claim 1 wherein said mold apparatus further comprises:
a. at least one first sheet retainer (240) positioned outward relative to said perimeter edge of said first mold portion; and
b. at least one second sheet retainer (249) positioned outward relative to said perimeter edge of said second mold portion;
c. said method further comprising:
  i. retaining a third portion of said heated first thermoplastic sheet with said first sheet retainer, prior to drawing reduced pressure through said plurality of perforations of said interior mold surface of said first mold portion, said third portion of said first thermoplastic sheet extending beyond said perimeter edge of said first mold portion; and
  ii. retaining a third portion of said heated second thermoplastic sheet with said second sheet retainer, prior to drawing reduced pressure through said plurality of perforations of said interior mold surface of said second mold portion, said third portion of said second thermoplastic sheet extending beyond said perimeter edge of said second mold portion.

4. The method of claim 3 wherein:
a. at least one first sheet retainer is reversibly linearly positionable relative to said perimeter edge of said first mold portion; and
b. at least one second sheet retainer is reversibly linearly positionable relative to said perimeter edge of said second mold portion;
c. said method further comprising:
  i. positioning reversibly at least one first sheet retainer independently at least one of toward and away from said perimeter edge of said first mold portion, with said third portion of said heated first thermoplastic sheet retained by said first sheet retainer, wherein reversible positioning of each first sheet retainer being conducted independently at least one of prior to and concurrently with drawing reduced pressure through said plurality of perforations of said interior mold surface of said first mold portion; and
  ii. positioning reversibly at least one second sheet retainer independently at least one of toward and away from said perimeter edge of said second mold portion, with said third portion of said heated second thermoplastic sheet retained by said second sheet retainer, wherein reversible positioning of each second sheet retainer being conducted independently at least one of prior to and concurrently with drawing reduced pressure through said plurality of perforations of said interior mold surface of said second mold portion.

5. The method of claim 1 wherein said method is free of heating said heated first thermoplastic sheet after formation of said heated first thermoplastic sheet from said first thermoplastic composition, and is free of heating said heated second thermoplastic sheet after formation of said heated second thermoplastic sheet from said second thermoplastic composition.

6. The method of claim 5 wherein said method is free of heating said first profiled thermoplastic sheet and said second profiled thermoplastic sheet prior to and during fusing together of said contact portion of said first surface of said first profiled thermoplastic sheet and said contact portion of said first surface of said second profiled thermoplastic sheet.

7. The method of claim 1 wherein:
a. said contact portion of said first surface of said first profiled thermoplastic sheet comprises a first flanged contact area defined by at least a portion of said perimeter edge of said first mold portion; and
b. said contact portion of said first surface of said second profiled thermoplastic sheet comprises a second flanged contact area defined by at least a portion of said perimeter edge of said second mold portion;
c. and further wherein fusing together of said first flanged contact area and said second flanged contact area results in formation of a fused flange extending outward from an exterior surface of said molded article.

8. The method of claim 1 further comprising compressing together, under conditions of elevated pressure, said contact portion of said first surface of said first profiled thermoplastic sheet and said contact portion of said first surface of said second profiled thermoplastic sheet, substantially concurrently with fusing together said contact portion of said first surface of said first profiled thermoplastic sheet and said contact portion of said first surface of said second profiled thermoplastic sheet.

9. The method of claim 1 wherein said interior space of said molded article is a substantially enclosed interior space.

10. The method of claim 1 wherein said heated first thermoplastic sheet and said heated second thermoplastic sheet each independently have a thickness of 0.5 mm to 25 mm.

11. The method of claim 1 wherein said first thermoplastic composition and said second thermoplastic composition each comprise a thermoplastic material selected independently from the group consisting of thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyolefins, thermoplastic (meth)acrylates, thermoplastic acrylonitrile-butadiene-styrene, thermoplastic styrene-acrylonitrile, thermoplastic acrylonitrile-stryrene-acrylate and combinations thereof.

12. The method of claim 1 wherein at least one of said first thermoplastic composition and said second thermoplastic composition independently comprise a reinforcing material selected from the group consisting of glass fibers, glass beads, carbon fibers, metal flakes, metal fibers, polyamide fibers, cellulosic fibers, nanoparticulate clays, talc and mixtures thereof.

13. The method of claim 1 wherein, at least one of:
a. said heated first thermoplastic sheet is a heated first multilayered thermoplastic sheet; and
b. said heated second thermoplastic sheet is a heated second multilayered thermoplastic sheet.

14. The method of claim 1 wherein said mold apparatus further comprises:
a. a sheet die having a first sheet slot portion and a second sheet slot portion, said first sheet slot portion and said second sheet slot portion being laterally spaced from each other, said sheet die further comprising a plurality of first gates that are reversibly positionable across said first sheet slot portion, and a plurality of second gates that are reversibly positionable across said second sheet slot portion;
b. further wherein said heated first thermoplastic sheet has a width and a length, and said heated second thermoplastic sheet has a width and a length; said method further comprising:
  i. passing said first thermoplastic composition through said first sheet slot portion of said sheet die thereby forming continuously said heated first thermoplastic sheet, and adjusting said plurality of said first gates across said first sheet slot portion so as to control:
    1. said width of said heated first thermoplastic sheet; and
    2. a thickness of said heated first thermoplastic sheet at least one of, across said width of said heated first thermoplastic sheet and along said length of said heated first thermoplastic sheet, and
  ii. passing said second thermoplastic composition through said second sheet slot portion of said sheet die thereby forming continuously said heated second thermoplastic sheet, and adjusting said plurality of said second gates across said second sheet slot portion so as to control:
    1. said width of said heated second thermoplastic sheet, and
    2. a thickness of said heated second thermoplastic sheet at least one of, across said width of said heated second thermoplastic sheet and along said length of said heated second thermoplastic sheet.

15. The method of claim 14 wherein:
a. said first mold portion, said second mold portion, said first longitudinal support and said second longitudinal support together form a mold assembly, said mold assembly being reversibly moveable in a plane beneath said sheet die, and said sheet die being substantially stationary;
b. said heated first thermoplastic sheet has a length, and said heated second thermoplastic sheet has a length; said method further comprising:
  i. moving said mold assembly at variable linear velocity beneath said sheet die, as said first portion of said second surface of said heated first thermoplastic sheet is contacted with said perimeter edge of said first mold portion, and as said first portion of said second surface of said heated second thermoplastic sheet is contacted with said perimeter edge of said second mold portion;
  ii. thereby further controlling, said thickness of said heated first thermoplastic sheet along said length of said heated first thermoplastic sheet over said first mold portion, and said thickness of said heated second thermoplastic sheet along said length of said heated second thermoplastic sheet over said second mold portion.

16. The method of claim 14 wherein said mold apparatus further comprises:
a. a first extruder having a terminal end that is in fluid communication with said first sheet slot portion of said sheet die, and a second extruder having a terminal end that is in fluid communication with said second sheet slot portion of said sheet die; said method further comprising:
  i. melting said first thermoplastic composition in said first extruder, thereby forming a first molten thermoplastic composition, and passing said first molten thermoplastic composition through said first sheet slot portion of said sheet die, thereby forming said heated first thermoplastic sheet; and
  ii. melting said second thermoplastic composition in said second extruder, thereby forming a second molten thermoplastic composition, and passing said second molten thermoplastic composition through said second sheet slot portion of said sheet die, thereby forming said heated second thermoplastic sheet.

17. The method of claim 14 wherein:
a. contacting said first portion of said second surface of said heated first thermoplastic sheet with said perimeter edge of said first mold portion occurs prior to necking of said heated first thermoplastic sheet; and
b. contacting said first portion of said second surface of said heated second thermoplastic sheet with said perimeter edge of said second mold portion occurs prior to necking of said heated second thermoplastic sheet.

18. The method of claim 1 wherein:
a. said heated first thermoplastic sheet has an interior portion interposed between said first surface and said second surface of said heated first thermoplastic sheet, said temperature of said heated first thermoplastic sheet being substantially uniform through said first surface, said interior portion and said second surface of said heated first thermoplastic sheet; and
b. said heated second thermoplastic sheet has an interior portion interposed between said first surface and said second surface of said heated second thermoplastic sheet, said temperature of said heated second thermoplastic sheet being substantially uniform through said first surface, said interior portion and said second surface of said heated second thermoplastic sheet.

\* \* \* \* \*